United States Patent
Mahmoud et al.

(10) Patent No.: US 10,067,669 B1
(45) Date of Patent: Sep. 4, 2018

(54) ONLINE CHARACTER RECOGNITION

(71) Applicant: King Fahd University of Petroleum and Minerals, Dhahran (SA)

(72) Inventors: Sabri A. Mahmoud, Dhahran (SA); Baligh M. Al-Helali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/648,710

(22) Filed: Jul. 13, 2017

(51) Int. Cl.
G06K 9/00 (2006.01)
G06F 3/0488 (2013.01)
G06K 9/22 (2006.01)
G06K 9/34 (2006.01)

(52) U.S. Cl.
CPC ..... G06F 3/04883 (2013.01); G06K 9/00402 (2013.01); G06K 9/222 (2013.01); G06K 9/344 (2013.01); G06K 2209/013 (2013.01)

(58) Field of Classification Search
CPC .. G06F 3/04883; G06F 17/242; G06F 3/0481; G06F 2203/04804; G06K 9/00402; G06K 9/222; G06K 9/344
USPC .... 382/173, 187, 186, 189, 311, 228, 13, 59
See application file for complete search history.

(56) References Cited

U.S. PATENT DOCUMENTS

| | | | | |
|---|---|---|---|---|
| 5,426,711 A * | 6/1995 | Kitamura | ............. | G06K 9/6807 382/187 |
| 5,577,135 A * | 11/1996 | Grajski | ............. | G06K 9/00422 382/187 |
| 5,734,750 A * | 3/1998 | Arai | ............. | G06K 9/4604 382/187 |
| 9,454,706 B1 * | 9/2016 | Musleh | ............. | G06K 9/6267 |
| 2008/0232689 A1 * | 9/2008 | Lee | ............. | G06F 17/2223 382/185 |
| 2010/0128985 A1 | 5/2010 | El-Sana et al. | | |
| 2010/0246963 A1 * | 9/2010 | Al-Muhtaseb | ....... | G06K 9/6297 382/185 |
| 2012/0114245 A1 * | 5/2012 | Lakshmanan | ...... | G06K 9/00409 382/186 |

(Continued)

OTHER PUBLICATIONS

Mohammad Tanvir Parvez et al., "Arabic Handwritten Alphanumeric Character Recognition using Fuzzy Attributed Turning Functions," Jan. 2011, 7 Pages.

*Primary Examiner* — Mekonen Bekele
(74) *Attorney, Agent, or Firm* — Oblon, McClelland, Maier & Neustadt, L.L.P.

(57) ABSTRACT

A character recognition device includes circuitry that is configured to remove duplicate successive points of a plurality of points in a handwritten stroke to form an enhanced handwritten stroke; space the plurality of points a uniform distance apart; detect primary strokes and secondary strokes of the enhanced handwritten stroke; merge the primary strokes; generate a primary merged stroke; extract raw point-based features from local features of the primary merged stroke; extract statistical features from computed statistics associated with the raw point-basal features to form primary merged stroke features; train and classify data from the primary merged stroke features and secondary stroke features to form stroke models; determine a plurality of primary merged stroke model candidates from the stroke models; compute a likelihood value for a combined set of primary stroke candidates and a set of secondary stroke candidates; and determine the handwritten stroke from the computing.

20 Claims, 20 Drawing Sheets

(56) References Cited

U.S. PATENT DOCUMENTS

| | | | | |
|---|---|---|---|---|
| 2014/0361983 A1* | 12/2014 | Dolfing | ............... | G06F 3/04883 345/156 |
| 2014/0363082 A1* | 12/2014 | Dixon | ................ | G06K 9/00402 382/187 |
| 2014/0363083 A1* | 12/2014 | Xia | .................... | G06K 9/00436 382/189 |
| 2015/0169949 A1* | 6/2015 | Keysers | ............. | G06K 9/00416 382/187 |
| 2015/0186718 A1* | 7/2015 | Rowley | .............. | G06K 9/00402 382/187 |
| 2015/0356360 A1* | 12/2015 | Wimmer | ............ | G06K 9/00402 382/189 |

\* cited by examiner a) End form of Dal "د", b) Beginning form of Kaf "ک", c) Middle form of Ha "ه".

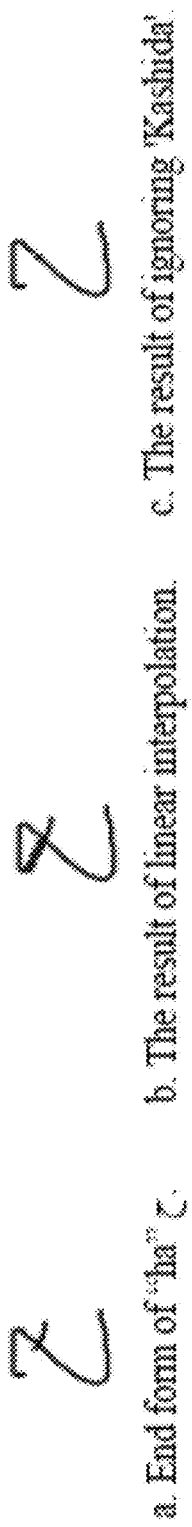
a. End form of "ha" ت.    b. The result of linear interpolation.    c. The result of ignoring 'Kashida'
Fig. 4A              Fig. 4B                    Fig. 4C

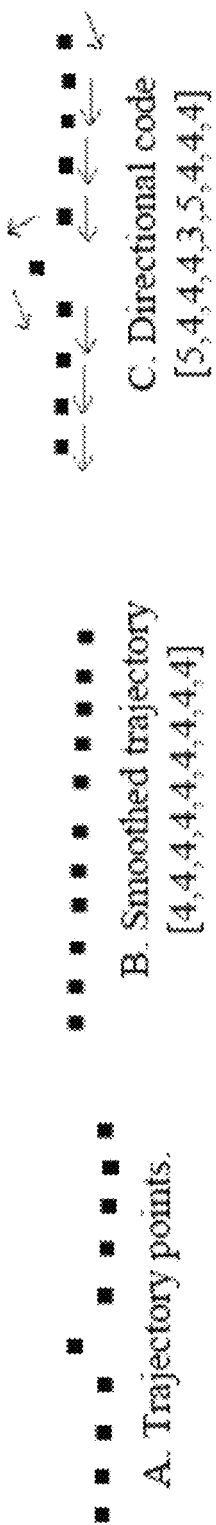

Fig. 7A
a) The character fa-B " ジ ", b) The basic shape of fa-B confused with the fa-I " ジ ".
Fig. 7B
Fig. 7C
c) An error in detecting the delayed stroke in the ya-M
Fig. 7D
d) merged two dots a) da-I "כ" as ha-B "ה"

b) wa-I "ז" as ma-B "מ"

a) gh-M "..." as fa-M "..."

b) ra-E "..." as da-E "..."

| Character | Isolated | Initial | Middle | Final | Character | Isolated | Initial | Middle | Final |
|---|---|---|---|---|---|---|---|---|---|
| Alif | ا | | | ـا | Dhad | ض | ضـ | ـضـ | ـض |
| Ba | ب | بـ | ـبـ | ـب | Taa | ط | طـ | ـطـ | ـط |
| Ta | ت | تـ | ـتـ | ـت | Dha | ظ | ظـ | ـظـ | ـظ |
| Tha | ث | ثـ | ـثـ | ـث | Ayn | ع | عـ | ـعـ | ـع |
| Jeem | ج | جـ | ـجـ | ـج | Ghain | غ | غـ | ـغـ | ـغ |
| Ha | ح | حـ | ـحـ | ـح | Fa | ف | فـ | ـفـ | ـف |
| Kha | خ | خـ | ـخـ | ـخ | Qaf | ق | قـ | ـقـ | ـق |
| Dal | د | | | ـد | Kaf | ك | كـ | ـكـ | ـك |
| The | ذ | | | ـذ | Lam | ل | لـ | ـلـ | ـل |
| Ra | ر | | | ـر | Meem | م | مـ | ـمـ | ـم |
| Za | ز | | | ـز | Noon | ن | نـ | ـنـ | ـن |
| Seen | س | سـ | ـسـ | ـس | He | ه | هـ | ـهـ | ـه |
| Sheen | ش | شـ | ـشـ | ـش | Waw | و | | | ـو |
| Sad | ص | صـ | ـصـ | ـص | Ya | ي | يـ | ـيـ | ـي |

Fig. 14

| Id | Chr | Lbl | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|---|
| 1 | ﻟ | E_aa | 251 | 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | ا | I_aa | 0 | 83 | 0 | 0 | 0 | 0 | 0 | 0 | 0 | 0 | 0 | 0 | 0 | 0 | 0 | 0 | 0 | 0 | 0 | 0 | 0 | 0 |
| 3 | ﻟ | E_ae | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 4 | ا | I_ae | 0 | 0 | 0 | 5 | 0 | 0 | 0 | 0 | 0 | 0 | 0 | 0 | 0 | 0 | 0 | 0 | 0 | 0 | 0 | 0 | 0 | 0 |
| 5 | ﻟ | E_ah | 0 | 0 | 0 | 0 | 2 | 0 | 0 | 0 | 0 | 0 | 0 | 0 | 0 | 0 | 0 | 0 | 0 | 0 | 0 | 0 | 0 | 0 |
| 6 | ا | I_ah | 0 | 0 | 0 | 0 | 0 | 7 | 0 | 0 | 0 | 0 | 0 | 0 | 0 | 0 | 0 | 0 | 0 | 0 | 0 | 0 | 0 | 0 |
| 7 | ع | B_ay | 0 | 0 | 0 | 0 | 0 | 0 | 64 | 0 | 0 | 0 | 0 | 0 | 0 | 0 | 0 | 0 | 0 | 0 | 0 | 0 | 0 | 0 |
| 8 | ع | M_ay | 0 | 0 | 0 | 0 | 0 | 0 | 0 | 50 | 0 | 0 | 0 | 0 | 0 | 0 | 0 | 0 | 0 | 0 | 0 | 0 | 0 | 0 |
| 9 | ب | B_ba | 0 | 0 | 0 | 0 | 0 | 0 | 0 | 0 | 52 | 0 | 0 | 5 | 0 | 0 | 0 | 0 | 0 | 0 | 0 | 0 | 0 | 0 |
| 10 | ب | E_ba | 0 | 0 | 0 | 0 | 0 | 0 | 0 | 0 | 0 | 9 | 0 | 0 | 0 | 0 | 0 | 0 | 0 | 0 | 0 | 0 | 0 | 0 |
| 11 | ب | I_ba | 0 | 0 | 0 | 0 | 0 | 0 | 0 | 0 | 0 | 2 | 15 | 0 | 0 | 0 | 0 | 0 | 0 | 0 | 0 | 0 | 0 | 0 |
| 12 | ب | M_ba | 0 | 0 | 0 | 0 | 0 | 0 | 0 | 0 | 5 | 0 | 0 | 31 | 0 | 0 | 0 | 0 | 0 | 0 | 0 | 0 | 0 | 0 |
| 13 | د | E_da | 1 | 0 | 0 | 0 | 0 | 0 | 0 | 0 | 0 | 0 | 0 | 0 | 37 | 0 | 0 | 0 | 0 | 0 | 0 | 0 | 0 | 0 |
| 14 | د | I_da | 0 | 0 | 0 | 0 | 0 | 0 | 0 | 0 | 0 | 0 | 0 | 0 | 0 | 37 | 0 | 0 | 0 | 0 | 0 | 0 | 0 | 0 |
| 15 | ذ | E_dh | 0 | 0 | 0 | 0 | 0 | 0 | 0 | 0 | 0 | 0 | 0 | 0 | 0 | 0 | 15 | 0 | 0 | 0 | 0 | 0 | 0 | 0 |
| 16 | ذ | I_dh | 0 | 0 | 0 | 0 | 0 | 0 | 0 | 0 | 0 | 0 | 0 | 0 | 0 | 0 | 0 | 15 | 0 | 0 | 0 | 0 | 0 | 0 |
| 17 | ي | E_ee | 0 | 0 | 0 | 0 | 0 | 0 | 0 | 0 | 0 | 0 | 0 | 0 | 0 | 0 | 0 | 0 | 19 | 10 | 0 | 0 | 0 | 0 |
| 18 | ي | I_ee | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | ف | B_fa | 0 | 0 | 0 | 0 | 0 | 0 | 0 | 0 | 0 | 0 | 0 | 0 | 0 | 0 | 0 | 0 | 0 | 0 | 33 | 14 | 1 | 0 |
| 20 | ف | M_fa | 0 | 0 | 0 | 0 | 0 | 0 | 0 | 0 | 0 | 0 | 0 | 0 | 0 | 0 | 0 | 0 | 0 | 0 | 4 | 14 | 0 | 2 |
| 21 | غ | B_gh | 0 | 0 | 0 | 0 | 0 | 0 | 0 | 0 | 0 | 0 | 0 | 0 | 0 | 0 | 0 | 0 | 0 | 0 | 0 | 0 | 4 | 0 |
| 22 | غ | M_gh | 0 | 0 | 0 | 0 | 0 | 0 | 0 | 0 | 0 | 0 | 0 | 0 | 0 | 0 | 0 | 0 | 0 | 0 | 1 | 4 | 0 | 2 |
| 23 | ح | B_ha | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 | ح | M_ha | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | ه | B_he | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 26 | ه | E_he | 0 | 0 | 0 | 0 | 0 | 0 | 0 | 0 | 0 | 0 | 0 | 0 | 0 | 0 | 0 | 0 | 0 | 3 | 0 | 0 | 0 | 0 |
| 27 | ه | M_he | 0 | 0 | 0 | 0 | 0 | 0 | 0 | 2 | 0 | 0 | 0 | 0 | 0 | 0 | 0 | 0 | 0 | 0 | 0 | 0 | 0 | 0 |
| 28 | ج | B_ja | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 29 | ج | M_ja | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 | ك | B_ka | 0 | 0 | 0 | 0 | 0 | 0 | 0 | 0 | 0 | 0 | 0 | 0 | 0 | 0 | 0 | 0 | 0 | 0 | 0 | 2 | 0 | 0 |
| 31 | ك | M_ka | 0 | 0 | 0 | 0 | 0 | 0 | 0 | 0 | 0 | 0 | 0 | 0 | 0 | 0 | 0 | 0 | 0 | 0 | 0 | 4 | 0 | 0 |
| 32 | خ | B_kh | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 33 | خ | M_kh | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Fig. 15A

| | | | | | | | | | | | | | | | | | | | | | | |
|---|---|---|---|---|---|---|---|---|---|---|---|---|---|---|---|---|---|---|---|---|---|---|
| 34 | ـل | B_la | 0 | 0 | 0 | 0 | 0 | 0 | 0 | 0 | 0 | 0 | 0 | 0 | 0 | 0 | 0 | 0 | 0 | 0 | 0 | 0 |
| 35 | ـلـ | E_la | 1 | 0 | 0 | 0 | 0 | 0 | 0 | 0 | 0 | 0 | 0 | 0 | 0 | 0 | 0 | 0 | 0 | 0 | 0 | 0 |
| 36 | لـ | M_la | 0 | 0 | 0 | 0 | 0 | 0 | 0 | 0 | 0 | 0 | 0 | 0 | 0 | 0 | 0 | 0 | 0 | 0 | 0 | 0 |
| 37 | ـم | B_m | 0 | 0 | 0 | 0 | 0 | 0 | 4 | 0 | 0 | 0 | 0 | 0 | 0 | 0 | 0 | 0 | 0 | 0 | 0 | 0 |
| 38 | ـن | B_na | 0 | 0 | 0 | 0 | 0 | 0 | 0 | 0 | 0 | 0 | 0 | 0 | 0 | 0 | 0 | 0 | 0 | 0 | 1 | 0 |
| 39 | ـنـ | E_na | 0 | 0 | 0 | 0 | 0 | 0 | 0 | 0 | 0 | 0 | 0 | 0 | 0 | 0 | 0 | 0 | 0 | 0 | 0 | 0 |
| 40 | نـ | I_na | 0 | 0 | 0 | 0 | 0 | 0 | 0 | 0 | 0 | 0 | 0 | 0 | 0 | 0 | 0 | 0 | 0 | 0 | 0 | 0 |
| 41 | ـنـ | M_n | 0 | 0 | 0 | 0 | 0 | 0 | 0 | 0 | 0 | 0 | 0 | 0 | 0 | 0 | 0 | 0 | 0 | 0 | 0 | 1 |
| 42 | ـر | E_ra | 1 | 0 | 0 | 0 | 0 | 0 | 0 | 0 | 0 | 0 | 0 | 8 | 0 | 0 | 0 | 1 | 0 | 0 | 0 | 0 |
| 43 | ر | I_ra | 0 | 0 | 0 | 0 | 0 | 0 | 0 | 0 | 0 | 0 | 0 | 1 | 0 | 0 | 0 | 0 | 0 | 0 | 0 | 0 |
| 44 | ـ | M_se | 0 | 0 | 0 | 0 | 0 | 0 | 0 | 0 | 0 | 0 | 0 | 0 | 0 | 0 | 0 | 0 | 0 | 0 | 0 | 0 |
| 45 | ـس | B_se | 0 | 0 | 0 | 0 | 0 | 0 | 0 | 0 | 0 | 0 | 0 | 0 | 0 | 0 | 0 | 0 | 0 | 0 | 0 | 0 |
| 46 | ـشـ | M_s | 0 | 0 | 0 | 0 | 0 | 0 | 0 | 0 | 0 | 0 | 0 | 0 | 0 | 0 | 0 | 0 | 0 | 0 | 0 | 0 |
| 47 | ـت | B_ta | 0 | 0 | 0 | 0 | 0 | 0 | 0 | 0 | 0 | 0 | 0 | 0 | 0 | 0 | 0 | 0 | 0 | 0 | 0 | 0 |
| 48 | ـ | E_ta | 0 | 0 | 0 | 0 | 0 | 0 | 0 | 0 | 0 | 0 | 0 | 0 | 0 | 0 | 0 | 0 | 0 | 0 | 0 | 0 |
| 49 | ـتـ | I_ta | 0 | 0 | 0 | 0 | 0 | 0 | 0 | 0 | 0 | 0 | 0 | 0 | 0 | 0 | 0 | 0 | 0 | 0 | 0 | 0 |
| 50 | ـتـ | M_ta | 0 | 0 | 0 | 0 | 0 | 0 | 0 | 0 | 0 | 0 | 1 | 0 | 0 | 0 | 0 | 0 | 0 | 0 | 0 | 1 |
| 51 | ـة | E_te | 0 | 0 | 0 | 0 | 0 | 0 | 0 | 0 | 0 | 0 | 0 | 0 | 0 | 0 | 0 | 0 | 0 | 0 | 0 | 0 |
| 52 | ـث | B_th | 0 | 0 | 0 | 0 | 0 | 0 | 0 | 1 | 0 | 0 | 0 | 0 | 0 | 0 | 0 | 0 | 0 | 0 | 1 | 0 |
| 53 | ـ | E_th | 0 | 0 | 0 | 0 | 0 | 0 | 0 | 0 | 0 | 0 | 0 | 0 | 0 | 0 | 0 | 0 | 0 | 0 | 0 | 0 |
| 54 | ـثـ | I_th | 0 | 0 | 0 | 0 | 0 | 0 | 0 | 0 | 0 | 0 | 0 | 0 | 0 | 0 | 0 | 0 | 0 | 0 | 0 | 0 |
| 55 | ـثـ | M_th | 0 | 0 | 0 | 0 | 0 | 0 | 0 | 0 | 0 | 0 | 0 | 0 | 0 | 0 | 0 | 0 | 0 | 0 | 0 | 0 |
| 56 | ـو | E_w | 0 | 0 | 0 | 0 | 0 | 0 | 0 | 0 | 0 | 0 | 0 | 0 | 0 | 0 | 0 | 0 | 0 | 0 | 0 | 0 |
| 57 | و | I_wa | 0 | 0 | 0 | 0 | 0 | 0 | 0 | 0 | 0 | 0 | 0 | 3 | 0 | 0 | 0 | 0 | 0 | 0 | 0 | 0 |
| 58 | ؤ | E_wl | 0 | 0 | 0 | 0 | 0 | 0 | 0 | 0 | 0 | 0 | 0 | 0 | 0 | 0 | 0 | 0 | 0 | 0 | 0 | 0 |
| 59 | ـي | B_ya | 0 | 0 | 0 | 0 | 0 | 0 | 0 | 5 | 0 | 0 | 0 | 0 | 0 | 0 | 0 | 0 | 0 | 0 | 0 | 0 |
| 60 | ي | E_ya | 0 | 0 | 0 | 0 | 0 | 0 | 0 | 0 | 1 | 0 | 0 | 0 | 0 | 0 | 0 | 0 | 0 | 0 | 0 | 0 |
| 61 | ـيـ | M_y | 0 | 0 | 0 | 0 | 0 | 0 | 0 | 0 | 0 | 0 | 10 | 0 | 0 | 0 | 0 | 0 | 0 | 0 | 0 | 0 |
| 62 | ي | I_ya | 0 | 0 | 0 | 0 | 0 | 0 | 0 | 0 | 0 | 0 | 0 | 0 | 0 | 0 | 0 | 0 | 0 | 0 | 0 | 0 |
| 63 | ـز | E_za | 0 | 0 | 0 | 0 | 0 | 0 | 0 | 0 | 0 | 0 | 0 | 0 | 0 | 0 | 0 | 0 | 0 | 0 | 0 | 0 |
| 64 | ز | I_za | 0 | 0 | 0 | 0 | 0 | 0 | 0 | 0 | 0 | 0 | 0 | 0 | 0 | 0 | 0 | 0 | 0 | 0 | 0 | 0 |
| | | | 254 | 84 | 1 | 5 | 2 | 7 | 68 | 52 | 63 | 12 | 15 | 47 | 45 | 41 | 15 | 15 | 23 | 10 | 40 | 36 | 7 | 6 |

Fig. 15B

| 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 3 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 0 | 2 | 0 | 0 | 0 | 0 | 0 | 0 | 0 | 0 | 0 | 0 | 1 | 2 | 0 | 0 | 0 | 0 | 0 | 0 | 2 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 2 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 2 | 2 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 3 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 31 | 9 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 10 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 30 | 0 | 4 | 0 | 0 | 0 | 0 | 0 | 0 | 0 | 0 | 3 | 0 | 0 | 0 | 0 | 0 | 0 | 0 | 0 | 0 |
| 0 | 0 | 0 | 52 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 44 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 16 | 9 | 0 | 0 | 0 | 0 | 0 | 0 | 0 | 0 | 0 | 0 | 0 | 0 | 0 | 0 | 0 | 0 |
| 0 | 0 | 0 | 0 | 0 | 7 | 3 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 13 | 6 | 0 | 0 | 0 | 0 | 0 | 0 | 0 | 0 | 0 | 0 | 0 | 0 | 0 | 0 |
| 0 | 0 | 0 | 0 | 0 | 0 | 0 | 16 | 26 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 15 | 3 | 0 | 0 | 0 | 0 | 0 | 0 | 0 | 0 | 0 | 0 | 0 | 0 |
| 0 | 0 | 0 | 0 | 0 | 0 | 0 | 0 | 0 | 2 | 4 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 188 | 8 | 13 | 0 | 0 | 0 | 0 | 0 | 0 | 0 | 0 | 0 |

Fig. 15C

| 0 | 0 | 0 | 0 | 0 | 0 | 0 | 0 | 0 | 0 | 0 | 0 | 41 | 0 | 0 | 0 | 0 | 0 | 0 | 0 | 0 | 0 |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 4 | 0 | 55 | 0 | 0 | 0 | 0 | 0 | 0 | 0 | 0 |
| 11 | 0 | 1 | 0 | 0 | 0 | 0 | 0 | 0 | 0 | 0 | 2 | 0 | 0 | 88 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 20 | 0 | 0 | 14 | 0 | 0 | 0 |
| 0 | 0 | 0 | 0 | 0 | 0 | 0 | 0 | 0 | 0 | 0 | 0 | 0 | 0 | 0 | 0 | 42 | 6 | 0 | 0 | 0 | 0 |
| 0 | 0 | 0 | 0 | 0 | 0 | 0 | 0 | 0 | 0 | 0 | 0 | 0 | 0 | 0 | 0 | 10 | 27 | 0 | 0 | 0 | 0 |
| 0 | 0 | 0 | 0 | 0 | 0 | 0 | 0 | 0 | 2 | 0 | 0 | 0 | 0 | 0 | 4 | 0 | 0 | 35 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 119 | 9 | 0 | 0 |
| 0 | 0 | 0 | 0 | 0 | 0 | 0 | 0 | 0 | 0 | 0 | 0 | 0 | 0 | 0 | 0 | 0 | 0 | 1 | 6 | 53 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 17 | 7 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 3 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 2 | 0 | 0 | 0 | 0 | 0 |
| 0 | 0 | 0 | 0 | 0 | 0 | 0 | 0 | 0 | 0 | 0 | 0 | 0 | 0 | 0 | 0 | 2 | 0 | 0 | 0 | 0 | 0 |
| 0 | 0 | 0 | 0 | 0 | 0 | 0 | 0 | 1 | 0 | 0 | 0 | 0 | 0 | 0 | 4 | 0 | 0 | 4 | 0 | 0 | 0 |
| 0 | 0 | 0 | 0 | 0 | 0 | 0 | 0 | 0 | 0 | 0 | 0 | 0 | 0 | 0 | 0 | 2 | 0 | 0 | 0 | 0 | 0 |
| 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 | 5 | 0 | 0 | 0 |
| 0 | 0 | 0 | 0 | 0 | 0 | 0 | 0 | 0 | 0 | 0 | 0 | 0 | 3 | 0 | 0 | 0 | 0 | 0 | 5 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 2 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 53 | 22 | 3 | 2 | 5 | 2 | 48 | 27 | 1 | 5 | 29 | 34 | 19 | 7 | 194 | 51 | 71 | 97 | 34 | 58 | 36 | 54 | 140 | 73 | 19 | 7 |

Fig. 15D

| 46 | 47 | 48 | 49 | 50 | 51 | 52 | 53 | 54 | 55 | 56 | 57 | 58 | 59 | 60 | 61 | 62 | 63 | 64 | #T | RR% |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 252 | 100% |
| 0 | 0 | 0 | 0 | 0 | 0 | 0 | 0 | 0 | 0 | 0 | 1 | 0 | 0 | 0 | 0 | 0 | 0 | 0 | 87 | 95% |
| 0 | 0 | 0 | 0 | 0 | 0 | 0 | 0 | 0 | 0 | 0 | 0 | 0 | 0 | 0 | 0 | 0 | 0 | 0 | 1 | 100% |
| 0 | 0 | 0 | 0 | 0 | 0 | 0 | 0 | 0 | 0 | 0 | 0 | 0 | 0 | 0 | 0 | 0 | 0 | 1 | 6 | 83% |
| 0 | 0 | 0 | 0 | 0 | 0 | 0 | 0 | 0 | 0 | 0 | 0 | 0 | 0 | 0 | 0 | 0 | 0 | 0 | 2 | 100% |
| 0 | 0 | 0 | 0 | 0 | 0 | 0 | 0 | 0 | 0 | 0 | 0 | 0 | 0 | 0 | 0 | 0 | 0 | 0 | 7 | 100% |
| 0 | 0 | 0 | 0 | 0 | 0 | 0 | 0 | 0 | 0 | 0 | 0 | 0 | 0 | 0 | 0 | 0 | 0 | 0 | 65 | 98% |
| 0 | 0 | 0 | 0 | 0 | 0 | 0 | 0 | 0 | 0 | 0 | 0 | 0 | 0 | 0 | 0 | 0 | 0 | 0 | 57 | 88% |
| 0 | 0 | 0 | 0 | 0 | 0 | 0 | 0 | 0 | 0 | 0 | 0 | 4 | 0 | 0 | 0 | 0 | 0 | 0 | 62 | 84% |
| 0 | 0 | 0 | 0 | 0 | 0 | 0 | 0 | 0 | 0 | 0 | 0 | 0 | 0 | 0 | 0 | 0 | 0 | 0 | 9 | 100% |
| 0 | 0 | 0 | 0 | 0 | 0 | 0 | 0 | 0 | 0 | 0 | 0 | 0 | 0 | 0 | 0 | 0 | 0 | 0 | 17 | 88% |
| 0 | 0 | 0 | 0 | 0 | 0 | 0 | 0 | 0 | 0 | 0 | 0 | 1 | 0 | 1 | 0 | 0 | 0 | 0 | 41 | 76% |
| 0 | 0 | 0 | 0 | 0 | 0 | 0 | 0 | 0 | 0 | 0 | 0 | 0 | 0 | 0 | 0 | 0 | 0 | 0 | 42 | 88% |
| 0 | 0 | 0 | 0 | 0 | 0 | 0 | 0 | 0 | 0 | 0 | 1 | 0 | 0 | 0 | 0 | 0 | 0 | 0 | 45 | 82% |
| 0 | 0 | 0 | 0 | 0 | 0 | 0 | 0 | 0 | 0 | 0 | 0 | 0 | 0 | 0 | 0 | 0 | 0 | 0 | 16 | 94% |
| 0 | 0 | 0 | 0 | 0 | 0 | 0 | 0 | 0 | 0 | 0 | 0 | 0 | 0 | 0 | 0 | 0 | 0 | 1 | 16 | 94% |
| 0 | 0 | 0 | 0 | 0 | 0 | 0 | 0 | 0 | 0 | 0 | 0 | 0 | 0 | 0 | 0 | 0 | 0 | 0 | 29 | 66% |
| 0 | 0 | 0 | 0 | 0 | 0 | 0 | 0 | 0 | 0 | 0 | 0 | 0 | 0 | 0 | 0 | 0 | 0 | 0 | 0 |  |
| 0 | 0 | 0 | 0 | 0 | 0 | 0 | 0 | 0 | 0 | 0 | 0 | 0 | 0 | 0 | 0 | 0 | 0 | 0 | 49 | 67% |
| 0 | 0 | 0 | 0 | 0 | 0 | 0 | 0 | 0 | 0 | 0 | 0 | 0 | 0 | 0 | 0 | 0 | 0 | 0 | 21 | 67% |
| 0 | 0 | 0 | 0 | 0 | 0 | 0 | 0 | 0 | 0 | 0 | 0 | 0 | 0 | 0 | 0 | 0 | 0 | 0 | 5 | 80% |
| 0 | 0 | 0 | 0 | 0 | 0 | 0 | 0 | 0 | 0 | 0 | 0 | 0 | 0 | 0 | 0 | 0 | 0 | 0 | 7 | 29% |
| 0 | 0 | 0 | 0 | 0 | 0 | 0 | 0 | 0 | 0 | 0 | 0 | 0 | 0 | 0 | 0 | 0 | 0 | 0 | 40 | 78% |
| 0 | 0 | 0 | 0 | 0 | 0 | 0 | 0 | 0 | 0 | 0 | 0 | 0 | 0 | 0 | 0 | 0 | 0 | 0 | 17 | 59% |
| 0 | 0 | 0 | 0 | 0 | 0 | 0 | 0 | 0 | 0 | 0 | 0 | 0 | 0 | 0 | 0 | 0 | 0 | 0 | 37 | 81% |
| 0 | 0 | 0 | 0 | 0 | 0 | 0 | 0 | 0 | 0 | 0 | 0 | 0 | 0 | 0 | 0 | 0 | 0 | 0 | 55 | 95% |
| 0 | 0 | 0 | 0 | 0 | 0 | 0 | 0 | 0 | 0 | 0 | 0 | 0 | 0 | 0 | 0 | 0 | 0 | 0 | 47 | 94% |
| 0 | 0 | 0 | 0 | 0 | 0 | 0 | 0 | 0 | 0 | 0 | 0 | 0 | 0 | 0 | 0 | 0 | 0 | 0 | 25 | 64% |
| 0 | 0 | 0 | 0 | 0 | 0 | 0 | 0 | 0 | 0 | 0 | 0 | 0 | 0 | 0 | 0 | 0 | 0 | 0 | 10 | 30% |
| 0 | 0 | 0 | 0 | 0 | 0 | 0 | 0 | 0 | 0 | 0 | 0 | 0 | 0 | 0 | 0 | 0 | 0 | 0 | 21 | 62% |
| 0 | 0 | 0 | 0 | 0 | 0 | 0 | 0 | 0 | 0 | 0 | 0 | 0 | 0 | 0 | 0 | 0 | 0 | 0 | 46 | 57% |
| 0 | 0 | 0 | 0 | 0 | 0 | 0 | 0 | 0 | 0 | 0 | 0 | 0 | 0 | 0 | 0 | 0 | 0 | 0 | 18 | 83% |
| 0 | 0 | 0 | 0 | 0 | 0 | 0 | 0 | 0 | 0 | 0 | 0 | 0 | 0 | 0 | 0 | 0 | 0 | 0 | 6 | 67% |
| 0 | 0 | 0 | 0 | 0 | 0 | 0 | 0 | 0 | 0 | 0 | 0 | 0 | 0 | 0 | 0 | 0 | 0 | 0 | 210 | 90% |

Fig. 15E

| 0 | 0 | 0 | 0 | 0 | 0 | 0 | 0 | 0 | 0 | 0 | 0 | 0 | 0 | 0 | 0 | 0 | 0 | 42 | 98% |
|---|---|---|---|---|---|---|---|---|---|---|---|---|---|---|---|---|---|----|-----|
| 0 | 0 | 0 | 0 | 0 | 0 | 0 | 0 | 0 | 0 | 0 | 0 | 0 | 0 | 0 | 0 | 0 | 0 | 59 | 93% |
| 0 | 0 | 0 | 0 | 0 | 0 | 0 | 0 | 0 | 0 | 0 | 0 | 0 | 0 | 0 | 0 | 0 | 0 | 106 | 83% |
| 0 | 1 | 0 | 0 | 0 | 0 | 0 | 0 | 0 | 0 | 0 | 0 | 0 | 0 | 0 | 0 | 0 | 0 | 36 | 56% |
| 0 | 0 | 0 | 0 | 0 | 0 | 0 | 0 | 0 | 0 | 0 | 0 | 0 | 0 | 0 | 0 | 0 | 0 | 48 | 88% |
| 0 | 0 | 0 | 0 | 0 | 0 | 0 | 0 | 0 | 0 | 0 | 0 | 0 | 0 | 0 | 0 | 0 | 1 | 38 | 71% |
| 1 | 0 | 0 | 0 | 1 | 0 | 0 | 0 | 0 | 0 | 0 | 0 | 0 | 0 | 0 | 0 | 0 | 0 | 44 | 80% |
| 0 | 0 | 0 | 0 | 0 | 0 | 0 | 0 | 0 | 0 | 0 | 0 | 0 | 0 | 0 | 0 | 0 | 0 | 138 | 86% |
| 0 | 0 | 0 | 0 | 0 | 0 | 0 | 0 | 0 | 0 | 1 | 0 | 0 | 0 | 0 | 0 | 0 | 0 | 71 | 75% |
| 0 | 0 | 0 | 0 | 0 | 0 | 0 | 0 | 0 | 0 | 0 | 0 | 0 | 0 | 0 | 0 | 0 | 0 | 24 | 71% |
| 0 | 0 | 0 | 0 | 0 | 0 | 0 | 0 | 0 | 0 | 0 | 0 | 0 | 0 | 0 | 0 | 0 | 0 | 0 | |
| 6 | 0 | 0 | 0 | 0 | 0 | 0 | 0 | 0 | 2 | 0 | 0 | 0 | 0 | 0 | 0 | 0 | 0 | 8 | 75% |
| 0 | 17 | 0 | 0 | 5 | 0 | 0 | 0 | 0 | 0 | 0 | 0 | 0 | 0 | 0 | 0 | 0 | 0 | 25 | 68% |
| 0 | 0 | 2 | 2 | 0 | 0 | 0 | 0 | 0 | 0 | 0 | 0 | 0 | 0 | 0 | 0 | 0 | 0 | 6 | 33% |
| 0 | 0 | 5 | 15 | 0 | 0 | 0 | 0 | 1 | 0 | 0 | 0 | 0 | 0 | 0 | 0 | 0 | 0 | 23 | 65% |
| 1 | 9 | 0 | 0 | 17 | 0 | 0 | 0 | 0 | 1 | 0 | 0 | 0 | 0 | 0 | 0 | 0 | 0 | 39 | 44% |
| 0 | 0 | 3 | 0 | 0 | 56 | 0 | 0 | 0 | 0 | 0 | 0 | 0 | 0 | 0 | 0 | 0 | 0 | 61 | 92% |
| 0 | 1 | 0 | 0 | 0 | 0 | 5 | 0 | 0 | 0 | 0 | 0 | 0 | 0 | 0 | 0 | 0 | 0 | 9 | 56% |
| 0 | 0 | 0 | 0 | 0 | 0 | 0 | 1 | 0 | 0 | 0 | 0 | 0 | 0 | 0 | 0 | 0 | 0 | 1 | 100% |
| 0 | 0 | 0 | 3 | 0 | 0 | 0 | 0 | 0 | 0 | 0 | 0 | 0 | 0 | 0 | 0 | 0 | 0 | 3 | 0% |
| 0 | 0 | 0 | 0 | 2 | 0 | 0 | 0 | 0 | 5 | 0 | 0 | 0 | 0 | 0 | 0 | 0 | 0 | 8 | 63% |
| 0 | 0 | 0 | 0 | 0 | 0 | 0 | 0 | 0 | 0 | 72 | 10 | 0 | 0 | 0 | 0 | 0 | 0 | 87 | 83% |
| 0 | 0 | 0 | 0 | 0 | 0 | 0 | 0 | 0 | 0 | 9 | 80 | 0 | 0 | 0 | 0 | 0 | 0 | 100 | 80% |
| 0 | 0 | 0 | 0 | 0 | 0 | 0 | 0 | 0 | 0 | 0 | 0 | 2 | 0 | 0 | 0 | 0 | 0 | 2 | 100% |
| 0 | 0 | 0 | 0 | 0 | 0 | 0 | 0 | 0 | 0 | 0 | 0 | 47 | 0 | 9 | 0 | 0 | 0 | 62 | 76% |
| 0 | 0 | 0 | 0 | 0 | 0 | 0 | 0 | 0 | 0 | 0 | 0 | 0 | 45 | 0 | 7 | 0 | 0 | 53 | 85% |
| 0 | 0 | 0 | 0 | 0 | 0 | 0 | 0 | 1 | 0 | 0 | 0 | 29 | 0 | 34 | 0 | 0 | 0 | 76 | 45% |
| 0 | 0 | 0 | 0 | 0 | 0 | 0 | 0 | 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | 0 | 0 | 0 | 0 | 0 | 12 | 5 | 18 | 67% |
| 0 | 0 | 0 | 0 | 0 | 0 | 0 | 0 | 0 | 0 | 0 | 0 | 0 | 0 | 0 | 3 | 6 | 10 | 60% | |
| 8 | 28 | 10 | 20 | 25 | 56 | 5 | 1 | 1 | 9 | 81 | 93 | 2 | 81 | 45 | 44 | 7 | 15 | 14 | 2565 | 82% |

Fig. 15F

ONLINE CHARACTER RECOGNITION

BACKGROUND

Field of the Disclosure

Online recognition of characters, such as handwritten words is described herein. The online character recognition can be applied to specific languages, such as the Arabic language or other languages with unique handwritten characteristics or markings.

Related Art

The widespread use of PDAs, touch screens, and tablet-PCs is an alternative to keyboards with the advantages of being more user-friendly, easy to use, and having a natural feel.

Some studies have addressed the main strokes of isolated Arabic letters (i.e. without any dots or diacritics) (Mezghani, Mitiche, and Cheriet 2002; Mezghani, Cheriet, and Mitiche 2003; Mezghani, Mitiche, and Cheriet 2004a; Mezghani, Mitiche, and Cheriet 2005; Mezghani, Mitiche, and Cheriet 2008; Izadi and Suen 2008). See Klassen, Tim J, and Malcolm I Heywood. 2002. "Towards the on-Line Recognition of Arabic Characters." In International Joint Conference on Neural Networks IJCNN, 2:1900-1905. Honolulu, Hi.; Mezghani, Neila, Amar Mitiche, and Mohamed Cheriet. 2002. "On-Line Recognition of Handwritten Arabic Characters Using a Kohonen Neural Network." In Proceedings Eighth International Workshop on Frontiers in Handwriting Recognition, 490-95. Ontario, Canada; Mezghani, Neila, Mohamed Cheriet, and Amar Mitiche. 2003. "Combination of Pruned Kohonen Maps for on-Line Arabic Characters Recognition." In Seventh International Conference on Document Analysis and Recognition, 900-904. Edinburgh, UK; Mezghani, Neila, Amar Mitiche, and Mohamed Cheriet. 2004a. "A New Representation of Character Shape and Its Use in on-Line Character Recognition by a Self Organizing Map." In International Conference on Image Processing, ICIP'04. 3:2123-26. Singapore; Mezghani, Neila, Amar Mitiche, and Mohamed Cheriet. 2005. "A New Representation of Shape and Its Use for High Performance in Online Arabic Character Recognition by an Associative Memory." International Journal of Document Analysis and Recognition (IJDAR) 7 (4). Springer: 201-10; Mezghani, Neila, Amar Mitiche, and Mohamed Cheriet. 2008. "Bayes Classification of Online Arabic Characters by Gibbs Modeling of Class Conditional Densities." IEEE Transactions on Pattern Analysis and Machine Intelligence 30 (7). IEEE: 1121-31; and Izadi, Sara, and Ching Y Suen. 2008. "Online Writer-Independent Character Recognition Using a Novel Relational Context Representation." In Seventh International Conference on Machine Learning and Applications, ICMLA'08, 867-70. San Diego, Calif., USA, each incorporated herein by reference in their entirety.

A comparison of three classifiers with automatically extracted features using Self Organizing Maps (SOMs) was presented in (Klassen and Heywood 2002). A dataset collected from twenty-five writers was used with reported recognition rates of 95%, 95%, and 83.3% using the perceptron, multi-layer perceptron, and genetic programming classifiers, respectively. Histograms of tangents and tangent differences were used as features in (Mezghani, Mitiche, and Cheriet 2004b; Mezghani, Mitiche, and Cheriet 2004a; Mezghani, Mitiche, and Cheriet 2005; Mezghani, Mitiche, and Cheriet 2008). See Mezghani, Neila, Amar Mitiche, and Mohamed Cheriet. 2004b. "On-Line Character Recognition Using Histograms of Features and an Associative Memory." In IEEE International Conference on Acousitics, Speech, and Signal Processing, ICASSP-04, 841-44. Montreal, Canada, incorporated herein by reference in its entirety.

An associative memory with the Hellinger distance was used in Mezghani, Mitiche, and Cheriet 2004b with a reported recognition rate of 94.56% on a dataset of about 7400 samples collected from seventeen writers. The dataset was expanded by adding five writers in Mezghani, Mitiche, and Cheriet 2008. The classification was carried using Bayesian approach with Gibbs modeling of the class-conditional probability density function. Different classifiers were used including direct Bayes, indirect Bayes, Combination of Bayes, Kohonen neural network, and nearest neighbor with reported recognition rates of 84.85%, 90.19%, 92.61%, 90%, and 94% respectively.

A feature called Relative Context (RC) derived from trajectory distances and angles was used in Izadi and Suen 2008. They used Support Vector Machine (SVM) with "one-against-one" approach for multi-class classification reporting a writer-independent recognition rate of 97.8%.

Dots were considered in online Arabic isolated letters recognition in Alimi and Ghorbel 1995; Al-Taani and Al-Haj 2010; Addakiri and Bahaj 2012; Omer and Ma 2010; Ismail and Abdullah 2012; Ismail and Abdullah 2013; Khodadad, Sid-Ahmed, and Abdel-Raheem 2011; Alijla and Kwaik 2012; Assaleh, Shanableh, and Hajjaj 2009; Harouni et al. 2012; Ramzi and Zahary 2014. See Alimi, Adel M, and O A Ghorbel. 1995. "The Analysis of Error in an on-Line Recognition System of Arabic Handwritten Characters." In Third International Conference on Document Analysis and Recognition (ICDAR'95), 890-93. Montreal, Canada; Al-Taani, Ahmad T, and Saeed Al-Haj. 2010. "Recognition of on-Line Arabic Handwritten Characters Using Structural Features." Journal of Pattern Recognition Research 1: 23-37; Addakiri, Khaoula, and Mohamed Bahaj. 2012. "On-Line Handwritten Arabic Character Recognition Using Artificial Neural Network." International Journal of Computer Applications 55 (13). Citeseer: 42-46; Omer, M A H, and Shi Long Ma. 2010. "Online Arabic Handwriting Character Recognition Using Matching Algorithm." In The 2nd International Conference on Computer and Automation Engineering (ICCAE), 2:259-62. Singapore; Ismail, Saad M, and Siti Norul Huda Sheikh Abdullah. 2012. "Online Arabic Handwritten Character Recognition Based on a Rule Based Approach." Journal of Computer Science 8 (11). Science Publications: 1859-68; Ismail, Saad M, and Siti Norul Huda Sheikh Abdullah. 2013. "Geometrical-Matrix Feature Extraction for on-Line Handwritten Characters Recognition." Journal of Theoretical and Applied Information Technology 49 (1); Khodadad, Iman, Maher Sid-Ahmed, and Esam Abdel-Raheem. 2011. "Online Arabic/Persian Character Recognition Using Neural Network Classifier and DCT Features." In IEEE 54th International Midwest Symposium on Circuits and Systems (MWSCAS), 1-4; Alijla, Basem, and Kathrein Kwaik. 2012. "Oiahcr: Online Isolated Arabic Handwritten Character Recognition Using Neural Network." Int. Arab J. Inf. Technol. 9 (4): 343-51; Assaleh, Khaled, Tamer Shanableh, and Husam Hajjaj. 2009. "Recognition of Handwritten Arabic Alphabet via Hand Motion Tracking." Journal of the Franklin Institute 346 (2). Elsevier: 175-89; Harouni, Majid, Dzulkifli Mohamad, Mohd Shafry Mohd Rahim, Sami M Halawani, and Mahboubeh Afzali. 2012. "Handwritten Arabic Character Recognition Based on Minimal Geometric Features." International Journal of Machine Learning and Computing 2 (5). IACSIT Press: 578-82; and Ramzi, A, and A Zahary. 2014. "Online Arabic Handwritten Character Recognition Using Online-Offline Feature Extraction and Back-Propagation Neural Network."

In 1st International Conference on Advanced Technologies for Signal and Image Processing (ATSIP), 350-55. Sousse, Tunisia. doi:10.1109/ATSIP.2014.6834634, each incorporated herein by reference in their entirety.

In Alimi and Ghorbel 1995, they used a feature vector of 16-directional codes obtaining a recognition rate of 93% using dynamic programming algorithms. Bouslama presented an online Arabic characters recognition system using structural features and fuzzy logic. See Bouslama, Faouzi. 1999. "Structural and Fuzzy Techniques in the Recognition of Online Arabic Characters." International Journal of Pattern Recognition and Artificial Intelligence 13 (7): 1027-40. In Omer and Ma 2010, decision tree and matching algorithm were used with Freeman chain codes that represent stroke directional features. They used 336 samples collected from four writers for training. For testing, they used samples of the twenty eight letters wrote randomly by five writers. They reported 97.6% recognition rate.

In Ismail and Abdullah 2012, a rule-based classifier was proposed and compared with Multilayer Perceptron (MLP) neural network and decision tree classifiers with a reported classification results of 97.6%, 98.85%, and 97.5%, respectively. They used horizontal and vertical projection profiles as features. The dataset was formed of 840 samples, 504 for training and 336 for testing collected by different writers. In Ramzi and Zahary 2014, the classification was carried in two stages. In the first stage, back propagation neural network was used for the recognition of fifteen non-dotted basic shapes of letters and logic programming method was used for handling delayed strokes based on their counts and locations. The evaluation was performed on a database of online and offline character samples (1050 samples for training and 420 for testing) collected from five users.

Several experiments were conducted using different online and offline features. The best-reported result was 74.8%, which was obtained using chain code online features combined with geometric features extracted from the offline images.

In Assaleh, Shanableh, and Hajjaj 2009, a video-based approach for online Arabic letters recognition via hand motion tracking was proposed. They used Hidden Markov Models (HMM) with time-dependent features and K-nearest neighbor (KNN) with time-independent features. Highest accuracy of 99.11% was reported using KNN on a dataset of the videos of writing each one letter eight times by two writers. The video-based approach for recognizing the handwriting implies several difficulties, such as processing videos and images. Moreover, its applicability is limited due to needed set up.

The different positional forms of Arabic letters were considered in some studies in El-Wakil and Shoukry 1989; El-Sheikh and El-Taweel 1989; Harouni, Mohamad, and Rasouli 2010 and in Azeem and Ahmed 2011. See El-Wakil, Mohamed S, and Amin A Shoukry. 1989. "On-Line Recognition of Handwritten Isolated Arabic Characters." Pattern Recognition 22 (2). Elsevier: 97-105; El-Sheikh, Talaat S, and S G El-Taweel. 1989. "Real-Time Arabic Handwritten Character Recognition." In Third International Conference on Image Processing and Its Applications. 212-16. Warwick, England; Harouni, Majid, Dzulkifli Mohamad, and Abdolreza Rasouli. 2010. "Deductive Method for Recognition of on-Line Handwritten Persian/Arabic Characters." In The 2nd International Conference on Computer and Automation Engineering (ICCAE), 5:791-95. Singapore; and Azeem, Sherif Abdel, and Hany Ahmed. 2011. "Recognition of Segmented Online Arabic Handwritten Characters of the ADAB Database." In 10th International Conference on Machine Learning and Applications and Workshops (ICMLA). 1:204-7. Hawaii, USA, each incorporated herein by reference in their entirety.

El-Wakil and Shoukry used a three-stage classifier combining hierarchical classifier, template matching, and KNN for recognizing position-dependent Arabic letter shapes. They reported recognition rate of 84% and reached 93% when features are manually weighted on a dataset collected from 7 writers. In El-Sheikh and El-Taweel 1989, a real-time Arabic handwritten character recognition system was developed using hierarchical classifier with a tree structure. The character shapes were grouped into four sets based on the position and each set was divided into four subsets according to the number of strokes. The reported recognition rate is 99.6% on a data collected by one writer. A deductive method for online handwritten Persian/Arabic characters recognition was proposed in Harouni, Mohamad, and Rasouli 2010. The input strokes are segmented into tokens and the features extracted from those tokens are fed-in in the Back Propagation and Multilayer Perceptron (BP/MLP) neural network classifier as an input pattern. The evaluation is conducted on a dataset of 31,620 samples of 102 different position-dependent Persian/Arabic character shapes. The recognition rates are computed for the four positions getting accuracies from 92.60% to 96.84%. The data is divided into training and testing sets without mentioning the writers overlapping.

In Azeem and Ahmed 2011, the recognition of the segmented characters was performed using a Support Vector Machine (SVM) classifier, reporting a recognition rate of 97.11%. They used a combination of temporal (viz. local writing direction) and spatial features (viz. height, width, aspect ratio, baseline, straightness, and the number of intersections). The samples are extracted by segmenting cursive text from the ADAB database which was presented in El Abed et al. 2009. See El Abed, Haikal, Volker Margner, Monji Kherallah, and Adel M Alimi. 2009. "Icdar 2009 Online Arabic Handwriting Recognition Competition." In 10th International Conference on Document Analysis and Recognition, ICDAR'09, 1388-92. Barcelona, Spain, incorporated herein by reference in its entirety.

A summary of the related work is given in Table 1, which shows the used datasets, extracted features, classification approaches, and obtained results. L column refers to character level, WI refers to writer-independent, and WD refers to writer-dependent.

TABLE 1

Summary of non-cursive online text recognition.

| L | Study | Features | Classification | Data | Results % |
| --- | --- | --- | --- | --- | --- |
| Basic Shapes | (Mezghani, Mitiche, and Cheriet 2002) | Fourier descriptors | Kohonen memory, KNN | 18 letter shapes, 7400 samples, 17 writers. | 88.38, 86.02 |
| | (Mezghani, Cheriet, and Mitiche 2003) | Global: Fourier descriptors. Local: tangents | Kohonen maps | | 93.54 |

TABLE 1-continued

Summary of non-cursive online text recognition.

| L | Study | Features | Classification | Data | Results % |
|---|---|---|---|---|---|
| Isolated Characters | (Mezghani, Mitiche, and Cheriet 2004a) | Histograms of tangents and tangent differences. | Associative memory, KNN | | 94.56, 95.34 |
| | (Mezghani, Mitiche, and Cheriet 2008) | Histograms of tangents and tangent differences. | Bayes(direct, indirect, combine), ANN, KNN | 528 samples for each letter, 22 writers. | 84.85, 90.19, 92.61, 90, 94 |
| | (Izadi and Suen 2008) | Relative Context (RC) | SVM | | WI: 97.8 |
| | (Alimi and Ghorbel 1995) | 16 directional code | Dynamic programming | 28 letters, Train: 20 sets of samples, Test: 280 samples | WI: 93 |
| | (Al-Taani and Al-Haj 2010) | Segments count, loops, sharp edges, secondary segments, density, orientation. | Decision tree | 28 Letters 1400 samples, 10 writers | 75.3 |
| | (Addakiri and Bahaj 2012) | Segments count, loops, sharp edges | FFBP ANN | | 83 |
| | (Omer and Ma 2010) | Freeman Chain code | Decision tree | 28 letters. Train: 336 samples, 4 writers. Test: random, 5 writers | 97.6 |
| | (Ismail and Abdullah 2013) | horizontal and vertical projection profile | Decision tree + ANN | 840 samples, train: 504, test: 336 | WI: 96.7 |
| | (Khodadad, Sid-Ahmed, and Abdel-Raheem 2011) | DCT | ANN | 32 Arabic/Persian Letters, 100 train and 20 test samples each | WI: 95.69 |
| | (Alijla and Kwaik 2012) | Online: strokes number, letter direction. secondary object Offline: density, aspect, alignment | ANN | 28 letters, 500 samples | WI: 95 WD: 99 |
| | (Assaleh, Shanableh, and Hajjaj 2009) | DCT | KNN, HMM | 28 Letters, 8 samples each, 2 writers | 99.11(K-NN) |
| | (Harouni et al. 2012) | Direction, orientation, length | BP/MLP | 29 letters, each 250, 25 writers | 96.50 |
| | (Ramzi and Zahary 2014) | Online: 8-directional freeman. Offline: zones geometric features | BPNN + logic programming. | 28 letters. online/offline Train: 1050, 5 writers. Test: 410. | 74.8 |
| Positional-Dependent Forms | (Harouni, Mohamad, and Rasouli 2010) | Direction, orientation, length | ANN | 102 Arabic/Persian, 31620 samples | 92.60-96.84 |
| | (Azeem and Ahmed 2011) | Temporal: direction. Spatial: height, width, aspect ratio, baseline, straightness, intersections | SVM | ADAB, manually segmented | 97.11 |
| | (El-Wakil and Shoukry 1989) | Static: dots count and position, secondary strokes count and slopes. Syntactic: primitive directions | hierarchical, templates, KNN | Position-dependent Arabic letters collected from 7 writers. | 84% |
| | (El-Sheikh and El-Taweel 1989) | Aspect ratio, extremum directions, distances, delayed strokes positions. | Hierarchical tree classifier | Position-dependent Arabic letters, one writer. | 99.6% |

There are some limitations in the reviewed studies. Most studies deal with a limited number of Arabic character classes. Characters were used having no diacritical marks in Mezghani, Mitiche, and Cheriet 2002; Mezghani, Cheriet, and Mitiche 2003; Mezghani, Mitiche, and Cheriet 2004a; Mezghani, Mitiche, and Cheriet 2005; Mezghani, Mitiche, and Cheriet 2008; Izadi and Suen 2008. This limitation is mainly due to the complexity of handling the delayed strokes. The diacritical marks were addressed in Alimi and Ghorbel 1995; Al-Taani and Al-Haj 2010; Addakiri and Bahaj 2012; Omer and Ma 2010; Ismail and Abdullah 2012; Ismail and Abdullah 2013; Khodadad, Sid-Ahmed, and Abdel-Raheem 2011; Alijla and Kwaik 2012; Assaleh, Shanableh, and Hajjaj 2009; Harouni et al. 2012; Ramzi and Zahary 2014; however, only isolated forms of characters were considered.

Different positional forms of the characters were considered in El-Wakil and Shoukry 1989; El-Sheikh and El-Taweel 1989; Harouni, Mohamad, and Rasouli 2010. The samples are collected individually in their non-cursive forms, which limits the usability of such work in cursive text recognition. This limitation is avoided in Azeem and Ahmed 2011, where the samples are extracted from a cursive text database (ADAB). However, it suffers from the limitations of the database (ADAB) itself, which is limited in the size of the data, the number of writers, and the coverage of the vocabulary. Such limitations are found almost in all the reviewed studies.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

A framework for Arabic online character recognition is developed. The framework integrates the different phases of online Arabic text recognition. The used data poses several challenges like delayed strokes handling, connectivity problems, variability, and style change of text. The delayed strokes are processed at the different phases differently to improve the overall performance. Many of the features are extracted, including several novel statistical features. Experimental results on challenging online Arabic characters show encouraging results.

The different positional forms of Arabic characters with their diacritical marks are considered herein. The samples are extracted from Online-KHATT in Mahmoud et al. 2016, which is a database of Arabic online unconstrained text written by over six hundred writers with wide vocabulary coverage. See Mahmoud, Sabri A., Hamzah Luqman, Baligh M. Al-Helali, Galal BinMakhashen, and Mohammad Tanvir Parvez. 2016. "Online-KHATT: An Open-Vocabulary Arabic Online Text Database", incorporated herein by reference in its entirety.

In one embodiment, a method of character recognition includes removing one or more duplicate successive points of a plurality of points in a handwritten stroke to form an enhanced handwritten stroke; spacing the plurality of points of the enhanced handwritten stroke a uniform distance apart; detecting, via circuitry, one or more primary strokes and one or more secondary strokes of the enhanced handwritten stroke; merging the one or more primary strokes; generating a primary merged stroke; extracting, via the circuitry one or more raw point-based features from local features of the primary merged stroke; extracting, via the circuitry one or more statistical features from computed statistics associated with the one or more raw point-based features to form one or more primary merged stroke features; training and classifying data from the one or more primary merged stroke features and one or more secondary stroke features to form one or more stroke models; identifying, via the circuitry one or more secondary strokes and recognizing a plurality of primary merged stroke model candidates from the one or more stroke models; computing, via the circuitry a likelihood value for a combined set of primary stroke candidates from a main classifier and a set of secondary stroke candidates from a secondary classifier; and determining, via the circuitry the handwritten stroke from the computing.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A illustrates the end form of the letter "ha" ح according to one embodiment;

FIG. 4B illustrates the end form of the letter Ain "ع" according to one embodiment;

FIG. 4C illustrates the isolated form of the letter "ha" ح according to one embodiment;

FIG. 6A illustrates a set of trajectory points according to one embodiment;

FIG. 6B illustrates a smoothed trajectory according to one embodiment;

FIG. 6C illustrates a directional code according to one embodiment;

FIG. 7A illustrates the character "fa-B" ف according to one embodiment;

FIG. 7B illustrates distinguishing between "fa-B" ف and "wa-I" و according to one embodiment;

FIG. 7C illustrates an error in detecting the delayed stroke in the ya-M according to one embodiment;

FIG. 7D illustrates a result of writing the two and three dots in one stroke according to one embodiment;

FIG. 14 is a table of the Arabic alphabet according to one embodiment; and

FIGS. 15A-15F are a table of a confusion matrix according to one embodiment.

DETAILED DESCRIPTION

Figure 1:
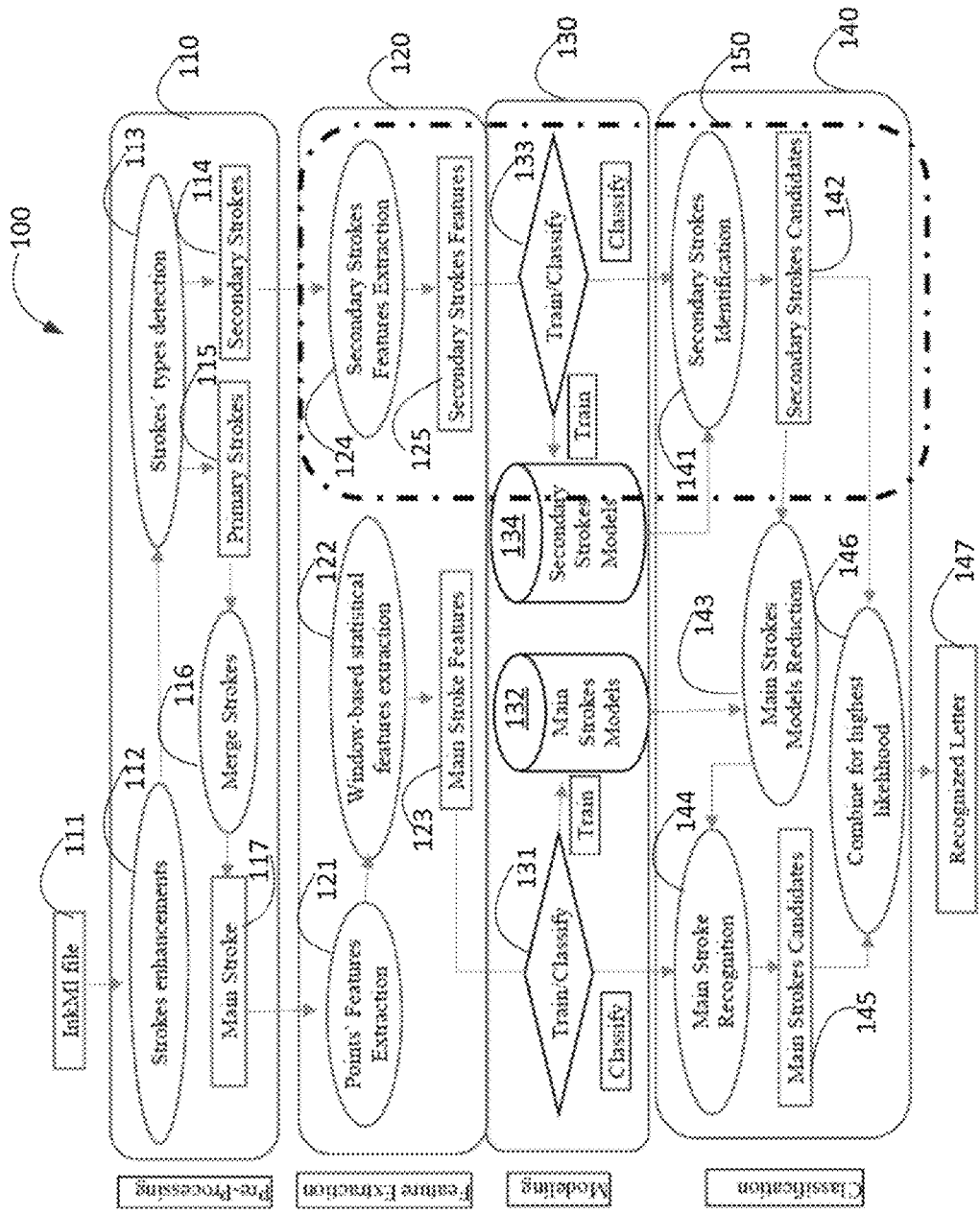
FIG. 1 is exemplary algorithm for recognizing characters according to one embodiment.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Handwriting recognition (HWR) is the automatic reading of handwritten information and converting it into electronic form. See Al-Badr, B., and S. Mahmoud. 1995. "Survey and Bibliography of Arabic Optical Text Recognition." Signal Processing 41 (1): 49-77, incorporated herein by reference in its entirety. The input can be sensed offline by optical scanning from paper documents and photographs or online by recording the pen movements from touch-screens and other devices. Due to the technological revolution in electronics and the rapid advance in electronic devices, the online character recognition field has gained more interest in recent years. The online text input is formed by a set of ordered strokes where each stroke is represented by a set of ordered points. The points are tuples of values representing the captured information that can be spatial (point position) or temporal (writing time or pressure of a point).

The Arabic language is the primary language for more than 420 million people. See UNESCO. 2012. "World Arabic Language Day." UNESCO, incorporated herein by reference in its entirety. Moreover, Arabic-like scripting is used in several languages, such as Kurdish, Persian, Pashto, and Urdu. In general, the Arabic alphabet has twenty eight basic letters as illustrated in FIG. 14. In some cases, researchers add the four Lam-Alif ligatures to form thirty six Arabic letters (viz. the basic 28, Alif-Maqsura, Ta-Marbuta, and the Hamza letters), which results in a total of forty letters. See Habash, Nizar Y. 2010. "Introduction to Arabic Natural Language Processing." Synthesis Lectures on Human Language Technologies 3 (1). Morgan \& Claypool Publishers: 1-187, incorporated herein by reference in its entirety.

Arabic text poses several challenges. Arabic script is cursive in nature, as most Arabic letters are connected to their neighboring letters. As shown in Table 1, Arabic letters can be written using two to four different shapes depending on their position in the word. The characters with two forms have no initial and middle forms and their corresponding cells in the table are left blank, e.g., Alif "ا ", Za "ز ", and Waw "و ". A letter is said to be isolated if it is not connected to the left or right, its position is middle if it is connected from both sides, and its position is at the beginning (or end) when it is connected only from the left (or right). The set of connected letters is a sub-word, which is called a Part of Arabic Word (PAW). Different letters might share the same body and only differ in the number and position of the dots and diacritical marks (e.g. ب , ت , ث ). Such symbols can be a source of confusion since they can be written less carefully. Some overlapped Arabic letters at certain positions of the word are represented by ligatures. For example, the letters "ل ", "ح ", and "ج " can be combined to write "لحج " as "لج ".

Several difficulties of Arabic handwriting recognition are discussed for the offline recognition in Parvez and Mahmoud 2013, such as connectivity and writing variability. Arabic online text recognition involves some additional challenges, such as the need for special hardware and the lack of a standard online Arabic benchmarking database. See Parvez, Mohammad Tanvir, and Sabri A Mahmoud. 2013. "Offline Arabic Handwritten Text Recognition: A Survey." ACM Computing Surveys. 45 (2). New York, N.Y., USA: ACM: 23:1-23:35, incorporated herein by reference in its entirety.

In one difficulty, a stroke can represent a single letter or multiple connected letters and can be used to represent the main text body or secondary symbols. Variations in these units can be due to size, number, order, location, shape, or writing direction of the strokes. Moreover, the writing on online devices is less controlled than using a pen on paper. The difficulties of writing on such surfaces are presented in Abuzaraida, Zeki, and Zeki 2013 and a survey of online Arabic text recognition is presented in Al-Helali and Mahmoud 2016. See Abuzaraida, Mustafa Ali, Akram M Zeki, and Ahmed M Zeki. 2013. "Problems of Writing on Digital Surfaces in Online Handwriting Recognition Systems." In 2013 5th International Conference on Information and Communication Technology for the Muslim World (ICT4M), 1-5. Rabat, Morocco; and Al-Helali, Baligh M., and Sabri A. Mahmoud. 2016. "Arabic Online Text Recognition (AOTR): A Survey", each incorporated herein by reference in their entirety.

The research on recognition of segmented (non-cursive) characters has several advantages. It can be used to validate the techniques employed in different phases of the recognition systems. It can be utilized in cursive text recognition systems, especially those using the analytic approach as in (Kour and Saabne 2014; Abd Alshafy and Mustafa 2014). See Kour, George, and Raid Saabne. 2014. "Fast Classification of Handwritten on-Line Arabic Characters." In 6th International Conference of Soft Computing and Pattern Recognition (SoCPaR), 312-18. Tunis, Tunisia; and Abd Alshafy, H A, and M E Mustafa. 2014. "HMM Based Approach for Online Arabic Handwriting Recognition." In 14th International Conference on Intelligent Systems Design and Applications (ISDA), 211-15. Okinawa, Japan. doi: 10.1109/ISDA.2014.7066288, each incorporated herein by reference in their entirety. It also can be used for specific purpose applications such as educational systems, forms filling, and digits recognition (digits in Arabic are non-cursive).

Most of the point-based features (local features) that are found in the related literature are extracted. A statistical layer is then added to form statistical features. Those features can be at the level of points, sub-strokes, the whole stroke, or a combination of the different levels. Moreover, the used dataset is extracted from a database of unconstrained online cursive text and not written in isolated form. Using such a dataset implies a need to address additional difficulties.

A recognizer for unconstrained Arabic online characters is described herein. The methodology of handling delayed strokes is also described herein. The delayed strokes are handled at different phases of the recognition process differently to improve the overall performance. Several statistical features are developed using a framework for generating different statistical features.

An exemplary algorithm 100 for recognizing characters according to embodiments described herein is illustrated in FIG. 1. A pre-processing phase 110, a primary feature extraction phase 120, a modeling stage 130, and a classification phase 140 are illustrated. A secondary feature extraction phase 150 overlaps portions of the primary feature extraction phase 120, the modeling stage 130, and the classification phase 140. The secondary feature extraction phase 150 processes the delayed strokes, such as markings and diacritics that occur after the base word is written.

The pre-processing phase 110 receives data of a character sample from a file 111. Stroke enhancements 112 are recognized within the character sample. In strokes' types detection 113, one or more types of strokes are detected. The detected stroke types are divided into one or more primary strokes 115 and one or more secondary strokes 114. The primary strokes 115 are merged together in merge strokes 116. A main stroke 117 is formed from the merged strokes 116.

The character sample input into the pre-processing phase 110 involves enhancing the input signal, detecting the primary and secondary delayed strokes, and then merging the primary strokes. The output is the main stroke and a set of secondary strokes (if any). The attributes of those strokes are obtained using a statistical features extraction method. The extracted features are then fed into the classification phase to identify the primary and secondary candidates with their likelihoods and combine them to select the most probable character.

Figures 2A, 2B, 2C:
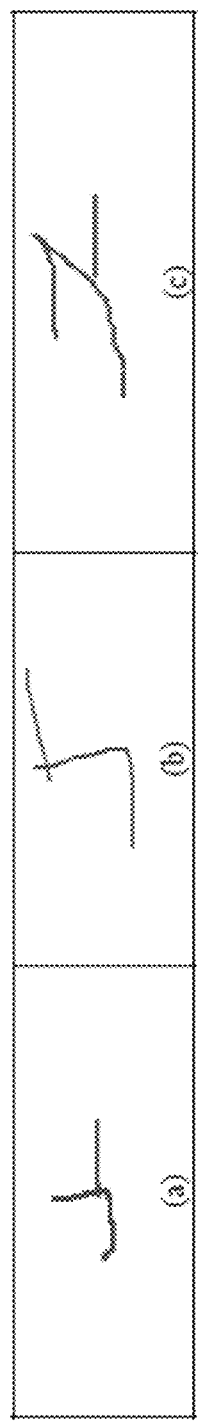
FIG. 2A is an illustration of the end form of the letter Dal "د" according to one embodiment.
FIG. 2B is an illustration of the beginning form o f Kaf "ك" according to one embodiment.
FIG. 2C is an illustration of the middle form of Ha "ح" according to one embodiment.

Delayed strokes handling has several challenges. Such strokes are called "delayed" as they are normally written after completing the strokes that represent the main body of the online text. Thus, processing of the delayed strokes is complicated when the delayed strokes are written before the main strokes. The main stroke represents the main body shape of the character whereas the secondary strokes normally represent the dots and diacritics. This assumption has drawbacks when the delayed stroke is a complement grapheme and in the presence of internal discontinuity as illustrated in FIGS. 2A-2C. For instance, the end form of the letter Dal "د" can be written using two strokes as illustrated in FIG. 2A. FIG. 2B is an illustration of the beginning form of Kaf "ك" and FIG. 2C is an illustration of the middle form of Ha "ح". Similarly, the beginning form of Kaf and the middle form of Ha can also be written using two strokes as illustrated in FIG. 2B and FIG. 2C, respectively. In FIGS. 2A-2C, none of the strokes represents a diacritical mark. Another complication is due to the variability of the shape, size, and location of the graphemes that represent them.

Some difficulties of handling delayed strokes can be avoided by imposing constraints, such as writing the main stroke before the secondary strokes as in Ramzi and Zahary 2014 or by forcing the main body of the input to be written in one stroke as in Alimi and Ghorbel 1995. Most reviewed studies considered the delayed strokes as diacritical marks. However, such constraints limit the applicability of the system on realistic data and impact extending the character's recognizer to the cursive case. More discriminative features may address the variety problem and possibly use more models for the diacritics.

For embodiments described herein, the delayed strokes are considered in different phases of the proposed recognizer. For example, detection and margining operations are performed when needed in the pre-processing phase. In the feature extraction phase, some features are extracted for the delayed strokes such as number, position, dimensions, aspect ratio, and changeability of writing directions. A hierarchical classifier is used to identify the detected delayed strokes. The classifier returns the candidate types along with the corresponding likelihoods.

In the first level, the candidates are filtered according to their position and the number of the strokes. For example, three secondary strokes lying above the main stroke are considered as three dots and the other options are ignored. A second level is involved in the case of having more than one candidate returned from the first level (e.g. an above secondary stroke which can be one dot, two dots, three dots, Hamza . . . ). This process assigns confidence values for the delayed strokes. The identified delayed stroke candidates are then used for lexicon reduction by eliminating the main shape models that are unlikely to have any of the detected secondary units. An extra step is performed to select the best main-secondary stroke combination. The selection is based on the classification likelihood of the main stroke candidate, the secondary unit identification likelihood, and the association likelihood between them.

The pre-processing phase 110 involves single-stroke pre-processing and multi-stroke pre-processing. Single-stroke pre-processing enhances the input signal using simplification, resampling, smoothing, and interpolation. The simplification process is performed by eliminating any number of duplicate successive points in a stroke leaving one. A weighted average smoothing filter is used to reduce the noise and eliminate hardware imperfections and trembles in the input handwriting signal caused by acquisition devices. Interpolation and resampling operations are applied to recover missing data and to make points lie at uniform distances. The linear interpolation introduced in Huang, Zhang, and Kechadi 2009 was used for this purpose. See Huang, Bing Quan, Y B Zhang, and M-T Kechadi. 2009. "Preprocessing Techniques for Online Handwriting Recognition." In Intelligent Text Categorization and Clustering, 25-45. Springer, incorporated herein by reference in its entirety.

Figure 3C:
FIG. 3C illustrates a third instance of a delayed stroke being larger than a main stroke according to one embodiment.
Figure 3B:
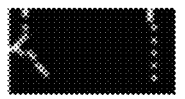
FIG. 3B illustrates a second instance of a delayed stroke being larger than a main stroke according to one embodiment.
Figure 3A:
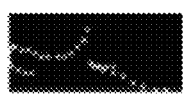
FIG. 3A illustrates a first instance of a delayed stroke being larger than a main stroke according to one embodiment.

The multi-stroke pre-processing stage is employed for inputs with more than one stroke. It implies detecting the primary and delayed strokes and then merging the primary strokes. The output is the main stroke and a set of secondary strokes (if any). The detection of the primary and secondary strokes is based on some global features (e.g. the size, distances, and the ratio of points lying above, below, left, right, and the order of input). Depending on these attributes individually can cause errors. For example, the size-based detection is not suitable since the delayed stroke can be larger than the main stroke, such as a first instance in FIG. 3A, a second instance in FIG. 3B, and a third instance in FIG. 3C. The location and relative position of the strokes are not useful in the case of segmented characters. Such features are more suitable for the cursive text case, since some methods can be utilized by baseline detection. The expected input order of the strokes has some variations, i.e., the delayed strokes can be input before the main stroke in some cases.

The merging process is developed in a manner that avoids difficulties resulting from the internal discontinuity problem, such as those illustrated in FIGS. 4A-4C where the main body is represented by more than one stroke. The order of the merge process during the pre-processing is important. If the merge is performed before the geometric processes, then some unwanted results may occur. For example, if the strokes of the segmented characters representing the end form of the letter "ha" ح in FIG. 4A are concatenated using a linear interpolation, then the output will be similar to the end form of the letter "ع" as in FIG. 4B.

This problem is avoided in Azeem and Ahmed 2011 by removing the small strokes that are on the left or the right sides of the main stroke. However, such deletion operation has its own problems. Removing the delayed stroke can cause confusion in some cases. For example, ignoring the "Kashida" stroke makes the character similar to the isolated form of the letter "ha" ح as illustrated in FIG. 4C. Similarly, removing the delayed strokes in FIGS. 2A-2C results in shapes that are similar to the beginning forms of Dal "د", Lam "ل", and Ha "ح" rather than the end form of Dal "د", beginning form of Kaf "ك", and middle form of Ha "ح", respectively. In this example, separating the two strokes can be adopted when modeling the Kaf letter as having a delayed stroke (La+AbvLine). However, this will cause errors when similar cases occur for letters that have no delayed strokes, such as the other cases.

Embodiments described herein also include the primary feature extraction phase 120 of statistical features illustrated in FIG. 1. Different statistics of several raw features at different levels produce a large set of statistical features. A points' features extraction 121 extracts the point features from the main stroke 117 received from the pre-processing phase 110. A window-based statistical features extraction 122 is a sliding window extractor, which produces main stroke features 123.

The primary feature extraction phase 120 also includes secondary strokes features extraction 124 of results received from the secondary strokes 114. Secondary strokes features 125 are obtained from the secondary strokes features extraction 124.

The raw features are the local features that are extracted at a level of points. Some of these features describe the geometric characteristics as the axis coordinates, distance (horizontal, vertical, and Euclidean), the relative position, aspect ratio, curvature, slope, tangent, cosine, sine, or angle with their differences. The temporal features are time, pressure, velocity, acceleration, and their changes. In addition, the chain codes of writing direction (ingoing and outgoing) are extracted. Such features represent the raw data that is used to compute the statistical features.

The statistical features are extracted by computing some statistics such as histogram, mean, mode, maximum, minimum, change (range), variance, and standard deviation from the raw point-based features for the sub-segments of the main strokes. The sub-segments are determined by the length and the overlapping parameters. In general, the statistical features represent global features that are based on the local features. The global features are those extracted from a set of points that may constitute the whole stroke or sub-stroke (sliding segments of the stroke from the window-based statistical features extraction 122) such as aspect ratio, bounding box, and length.

By using the feature extraction method described herein, statistical features can be obtained, such as a histogram of Freeman code, mean of a tangent, mode of angles, variance of x distances, mean of Freeman code, histogram of cosine, variance of angles, mean of y distances, mode of Freeman code, mean of sine, variance of x-axis, mean of curliness, maximum of Freeman code, variance of cosine, change of Y-axis, variance of curvature, variance of Freeman code, histogram of angles, mean of relative X-axis, mean of acceleration, mean of angles, change of relative Y-axis, and mean of aspect ratio.

Figure 5B:
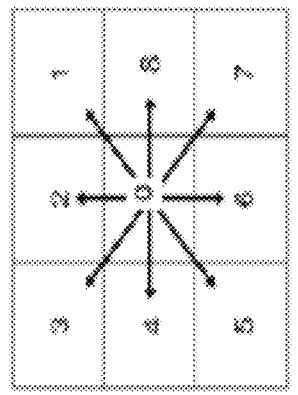
FIG. 5B illustrates a modified Freeman Chain Code according to one embodiment.
Figure 5A:
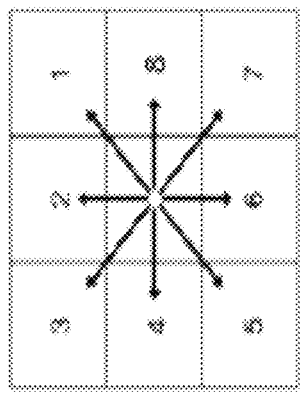
FIG. 5A illustrates a Freeman Chain Code according to one embodiment.

The method of obtaining the statistical features has several advantages in addition to using them as global features. The method performs pre-processing operations, it can be used as a codebook, and it enhances the extracted features (e.g. mean of writing direction). For example, the Freeman Chain Code feature is extracted for each point, as illustrated in FIG. 5A. In order to capture the emphasis nature of writing, a modified Freeman Chain Code illustrated in FIG. 5B can be used.

For example, an original input of a set of trajectory points as illustrated in FIG. 6A provides the result of a classical pre-processing of a smoothed trajectory as illustrated in FIG. 6B. This segment is represented as one writing movement as in Harouni, Mohamad, and Rasouli 2010, or as a primitive shape in El-Wakil and Shoukry 1989. However, the whole set of these operations can be alternated by simply taking the mode of the raw direction code feature extracted from the original input in a directional code as illustrated in FIG. 6C, i.e. mode ([5,4,4,4,4,3,5,4,4,4])=4).

The modeling stage 130 includes a determination to train or classify 131 results from the main stroke features 123. Training occurs via one or more main strokes models 132. Results from the main strokes models 132 are forwarded to a main strokes models reduction 143 in the classification phase 140. Classification of the main stroke features 123 is forwarded to main stroke recognition 144 in the classification phase 140.

The modeling stage 130 also includes a determination to train or classify 133 results from the secondary strokes features 125. Training occurs via one or more secondary strokes models 134. Results from the secondary strokes models 134 are forwarded to secondary strokes identification 141 in the classification phase. Classification of the secondary strokes features 125 is also forwarded to the secondary strokes identification 141 in the classification phase 140.

The classification phase 140 includes a first process in which identification of the secondary (i.e. delayed) strokes is made. The outcome of secondary models candidates is used for reducing the models of the main strokes. In a second process, the input main stroke is classified against the reduced main models. In a third process, the results of the classification of both main strokes and secondary strokes are combined to obtain the overall result of the character classification.

For secondary strokes identification 141, different classifiers are used such as K-nearest neighbors (KNN), Bayes network (Bnet) and Dynamic Bayes Networks (DBN). However, the main strokes classification is carried out using DBN-based Hidden Markov Models (HMM) classifier. The parameters of each classifier are chosen empirically as described herein. Reasons for using an HMM classifier include the success for speech recognition, the similarity of the digital representations of both speech and online text, and its robustness to the intra-variability.

After the classification is performed on the main and secondary strokes, a set of main strokes candidates 145 for the models and another set of secondary strokes candidates 142 for the models are obtained. Each set has a corresponding set of likelihood values, which are combined for a highest likelihood 146. The final recognition result 147 is a set of character candidates which are identified by both main and secondary models of strokes. A virtual secondary model is used to refer to none for those characters having no secondary strokes.

FIG. 1 also illustrates the secondary feature extraction phase 150, which overlaps portions of the primary feature extraction phase 120, the modeling stage 130, and the classification phase 140. FIG. 1 illustrates how the secondary feature extraction phase 150 is an integral phase with each of the primary feature extraction phase 120, the modeling stage 130, and the classification phase 140.

The likelihood of the candidates of characters is computed according to the corresponding main and secondary candidates. Let $M=\{M_i\}_{i=1}^{m}$ be the set of the main candidates of models from the main classifier and let $S=\{S_j\}_{j=1}^{l}$ be the secondary candidates of models from the secondary classifier where the corresponding likelihoods are computed, normalized, and denoted as $ML=\{ML_i\}_{i=1}^{m}$, and $SL=\{SL_j\}_{j=1}^{l}$, respectively. The likelihoods of the class candidates of characters $CL_{i,j}$ are computed as in Equation 1 where $\lambda$ is a scalar factor of the weight of the secondary candidates.

$$CL_{i,j} = ML_i + \lambda(SL_j) \quad (1)$$

The non-zero character likelihood candidates are denoted as $C_{i,j}$ and refer to the character class that has the main model $M_i$ and the secondary object $S_j$. The selected class is the one having the maximum aggregative likelihood, i.e. $C_{ij}$ where, $$\hat{C}ij = \arg\{\max_{ij} CL_{i,j}\} \quad (2)$$

The grouping of letters depends on the basic shape and is usually performed regarding their isolated forms. However, considering the position-dependent shapes provides a more useful clustering methodology. For example, the beginning and middle basic forms of the letters ي،ث are similar to their corresponding forms of the commonly clustered letters ب،ت،ث. This reduces the number of the used classification models and simplifies the main stroke classification process.

Intra-variation is the variability of the samples that belong to the same class. This variation can be originated from the Arabic text styles (e.g. Naskh, Ruqaa) or from the handwriting process itself. This variation can be left to be handled implicitly by the used classifier or it can be addressed explicitly when modeling the desired classes. In one embodiment described herein, the two approaches are combined to address the intra-variability. For some characters, different classification models are considered when there is a significant variability regarding the writing styles (e.g. "س" vs. "س") or when it can be represented by a different number of strokes (e.g. "Kaf"). On the other hand, variations that are subject to the handwriting process itself such as size and direction are handled by the used statistical classifier.

A semi-automatic methodology is adopted to extract the classification models for each character and to annotate the delayed strokes. The training samples of each character are utilized for building its model based on the global features representing number, position, and dominating writing direction of the strokes.

Experimental work associated with embodiments described herein included data preparation, data labeling, modeling, and testing the integrated system and analyzing the results. The main and secondary strokes were classified separately and the results of the two classifiers were combined to identify the input character.

The used dataset was a subset of the segmented characters of the Online-KHATT database in Mahmoud et al. 2016. The database included 10,040 lines of online Arabic text written by 623 writers using Android- and Windows-based devices. The samples of characters were acquired by segmenting online Arabic text into the corresponding characters. The dataset was divided into three separate subsets as training, validation, and testing sets in a writer-independent manner.

In addition to the position-dependent character labeling of the samples, a semi-automatic stroke-based annotation was performed. For evaluation, the data was split into 70%, 15%, and 15% for training, validation, and testing sets, respectively. The statistics of the dataset are illustrated in Table 3.

TABLE 3

Statistics of On-KHATT segmented characters.

|  | Isolated | Begin | Middle | End | Total | Writers |
|---|---|---|---|---|---|---|
| Training | 4013 | 4101 | 3158 | 4298 | 15570 | 48 |
| Validation | 908 | 994 | 727 | 1033 | 3662 | 13 |
| Testing | 946 | 942 | 686 | 989 | 3563 | 12 |
| Total | 5867 | 6037 | 4571 | 6320 | 22795 | 73 |

In the first stage of the experimental work, the training and validation datasets were used in intensive experiments to select the suitable parameters (e.g. pre-processing, feature extraction, and classification settings). In this stage, the classification of the single and multi-strokes was addressed to generate models for both basic shapes and delayed strokes. The classification models for single-strokes and multi-strokes were utilized. The different parts and modules were integrated to form the desired recognizer.

For the twenty eight basic shape classes, each had at least one hundred training samples and thirty validation samples. The corresponding datasets contained 11,801 training samples, 2880 validation samples, and 2565 testing samples. To conduct a balanced evaluation, one hundred random samples were selected for training and thirty samples were selected for validation. The results of each class were averaged. However, the testing was performed on all available data for the considered classes.

The system was implemented using Bnet Matlab tool version 7 developed by Kevin Murphy. See Murphy, Kevin Patrick. 2002. "Dynamic Bayesian Networks: Representation, Inference and Learning." California, Berkeley, incorporated herein by reference in its entirety. Several pre-processing operations were examined with different orders. Good results were obtained when applying simplification, smoothing, interpolation, and resampling.

One hundred three features were extracted. Some irrelevant features were ignored, such as maximum and minimum X-Y coordinates when no size normalization pre-processing was performed. Due to a large number of features, it was difficult to examine all possible combinations ($2^{103}$ combinations). As a result, selected combinations were examined and a Principal Component Analysis (PCA) approach for selection of features was used in the analysis.

Several features were extracted from the online trajectory input of the points and statistical features from a sliding window of the input. Local writing direction represented by cosine and sine trigonometric functions was used in combination with other features as in Azeem and Ahmed 2011; Alijla and Kwaik 2012 and it is also used alone as in Eraqi and Azeem 2011. See Eraqi, Hesham M, and Sherif Abdel Azeem. 2011. "An On-Line Arabic Handwriting Recognition System: Based on a New On-Line Graphemes Segmentation Technique." In International Conference on Document Analysis and Recognition (ICDAR), 409-13. Beijing, China, incorporated herein by reference in its entirety. The average of the local direction was computed in a sliding window.

Table 4 illustrates that the statistical feature outperforms the points-based feature. Hence, the statistical features were adopted in the other experiments. Table 4 illustrates some of the results obtained using the validation set.

TABLE 4

Some results of basic shapes classification using the validation set.

| Features | RR | Top3 |
|---|---|---|
| Local writing direction Cos; Sin | 32% | 52% |
| Mean(Cos); Mean(Sin) from a sliding segment window | 54% | 53% |
| In_FreeMan (Histogram, Mode, Mean, Var); X (Change); Y (Change); Curvature (Mean) | 56% | 85% |
| In_FreeMan (Histogram, Mode, Mean) Curvature, Mean. Cos (Mean); Sin (Mean); In_FreeMan (Mean); Out_FreeMan (Mean) | 57% | 84% |
|  | 57% | 85% |
| PCA (10 features) | 61% | 86% |
| Cos (Mean); Sin (Mean); In_FreeMan (Mean, Histogram); Out_FreeMan (Mean); Curvature (Mean) RX (Mean); RY (Mean) | 66% | 88% |
| PCA (15 features) | 73% | 92% |

The best results were obtained when using PCA selection of features method. In this experiment, one hundred three statistical features were used (a 138-diminsional feature vector). The PCA method was applied to fifteen selected values (several values were tried). The other parameters were selected empirically. The statistical features were extracted using a sliding window having a size of eighteen points with six points overlapping. The numbers of hidden states and Gaussian mixtures were fixed for all models at fifteen and sixty four, respectively.

In the classification of the delayed strokes, simpler classification methods were used. Different classifiers such as K-nearest neighbor's (KNN), Bayes network (Bnet) and Dynamic Bayes Networks (DBN) were used with several features. The best result was 92% when using KNN classifier with delta x, delta y, and aspect ratio features.

A recognition rate of 82% was obtained on a test set of 2565 samples that were not uniformly distributed since some characters were more frequent and some characters had no test samples (e.g. se-B "" and ya-I ""). However, they were shown in the confusion matrix (illustrated in FIGS. 15A-15F) because samples of other characters were recognized as those characters.

On the analysis of the testing confusion matrix illustrated in FIGS. 15A-15F, the following points were noted.

The inclusion of the delayed strokes resulted in resolving several confusion cases found in the basic shape classifier. FIG. 7A illustrates the character "fa-B" . Use of the delayed strokes position and the count helped to distinguish between characters with the same basic shapes, such as "fa-B"  and "wa-I"  as illustrated in FIG. 7B.

The accuracy of the complete recognizer was dependent on the performance of the basic classifiers. There were some errors that were due to misclassification of basic shapes, such as recognizing ha-B as da-I. There were errors in the classification of the delayed strokes which lead to an incorrect character recognition. For example, an error in detecting the delayed stroke in the ya-M "" illustrated in FIG. 7C resulted in recognizing it as th-M "". Several classification inter-errors in the characters ba, ta, and th were caused because of errors in identifying the delayed strokes. This was a result of writing the two and three dots in one stroke illustrated in FIG. 7D. For example, the merged two dots was recognized as three dots.

Figures 8A, 8B, 8C:
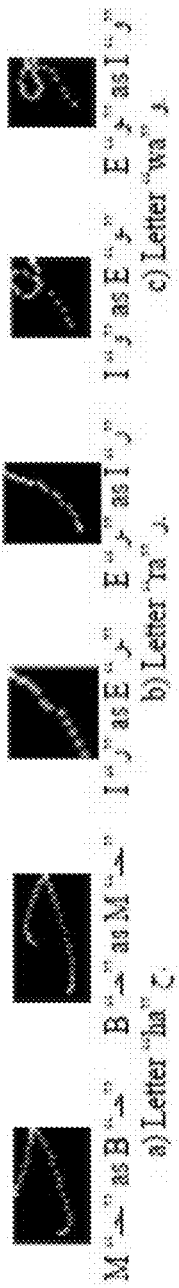
FIG. 8A illustrates a segmentation-based intra-error for the letter "ha" according to one embodiment.
FIG. 8B illustrates a segmentation-based intra-error for the letter "ra" according to one embodiment.
FIG. 8C illustrates a segmentation-based intra-error for the letter "wa" according to one embodiment.

Segmentation-based intra-errors were due to confusion between different positional forms of the same character. The beginning (isolated) form was similar to the middle (end) form for most characters because the main difference is a connecting stroke called "Kashida". Examples of such errors are illustrated for the letter "ha" in FIG. 8A, the letter "ra" in FIG. 8B, and the letter "wa" in FIG. 8C.

Figures 9A, 9B:
FIG. 9A illustrates a segmentation-based inter-error for a confusion of "da-I" as being "ha-B" according to one embodiment.
FIG. 9B illustrates a segmentation-based inter-error for a confusion of "wa-I" as being "ma-B" according to one embodiment.

Segmentation-based inter-errors are errors caused by confusion between different positional classes of different characters that seem to be similar after segmentation. Examples of such errors are illustrated for a confusion of "da-I" as being "ha-B" in FIG. 9A, and a confusion of "wa-I" as being "ma-B" in FIG. 9B.

Figure 10A:
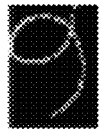
FIG. 10A illustrates how "gh-M" can be confused as "fa-M" according to one embodiment.
Figure 10B:
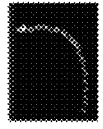
FIG. 10B illustrates how "ra-E" can be confused as "da-E" according to one embodiment.

Errors due to writing distortion come from the confusion that is originated from the writing quality, which can be influenced by some variations, such as the writing direction of movement. FIG. 10A illustrates how "gh-M" can be confused as "fa-M". Curvatures can also influence some variations. FIG. 10B illustrates how "ra-E" can be confused as "da-E".

Segmentation-based intra-errors accounted for one hundred sixteen errors (i.e. about 25% of the total errors) and segmentation-based inter-errors accounted for about two hundred ten errors (i.e. about 45% of the total errors). Such errors were reasonable and were due to a high similarity between the confused characters. The errors disappeared when a top-3 recognition rate was computed.

Figure 11:
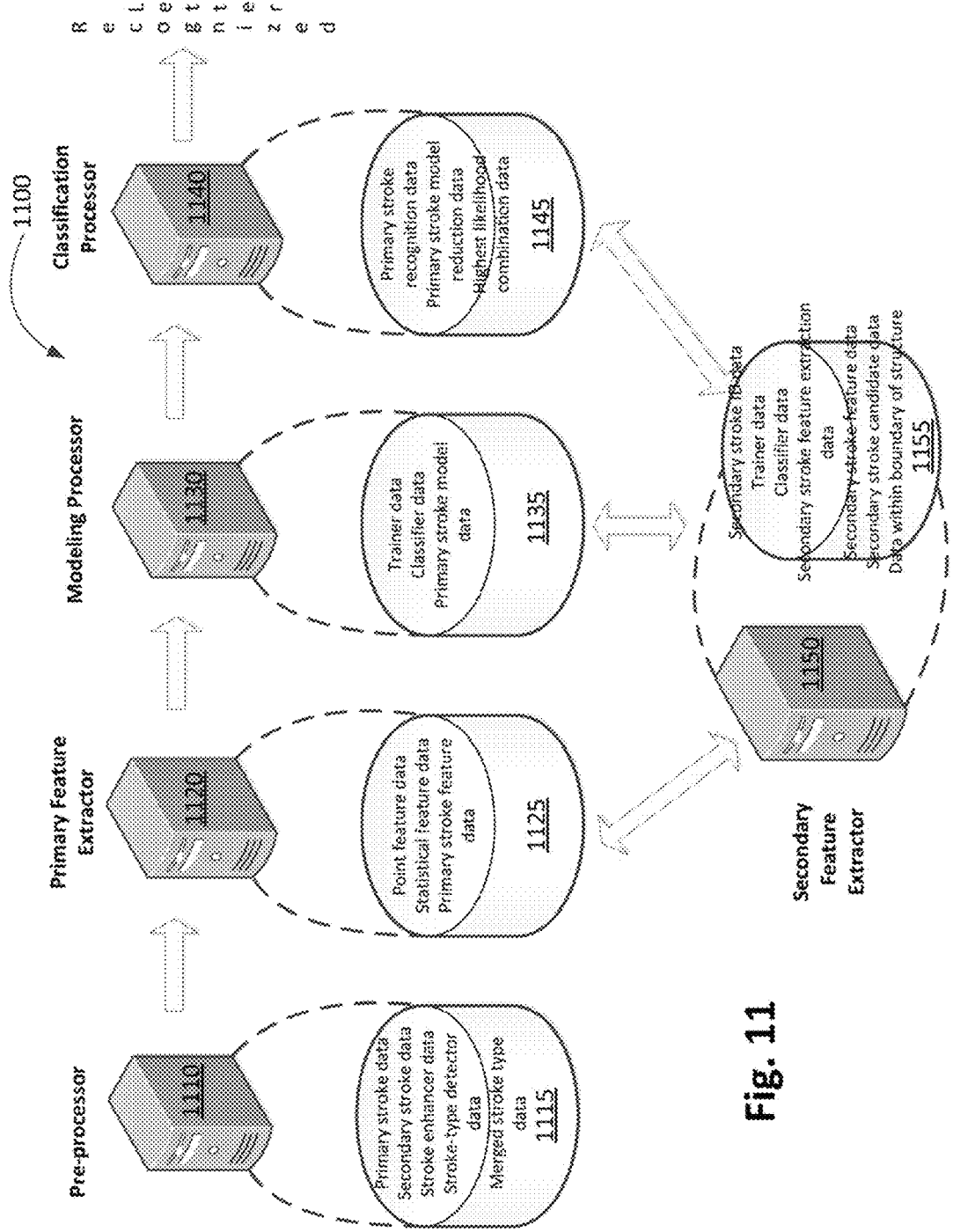
FIG. 11 is a block diagram of an exemplary architectural server and database framework according to one embodiment.

FIG. 11 is a block diagram of an exemplary architectural server and database framework 1100 for implementing embodiments described herein. A pre-processor 1110 is a server having circuitry configured to execute the processes of the pre-processing phase 110. The pre-processor 1110 is integrated with a pre-processing database 1115. The pre-processing database 1115 includes, but is not limited to stroke enhancer data, stroke-type detector data, primary stroke data, secondary stroke data, and merged stroke type data.

A primary feature extractor 1120 is a server having circuitry configured to execute the processes of the primary feature extraction phase 120. The primary feature extractor 1120 is integrated with a primary feature extractor database 1125. The primary feature extraction database 1125 includes, but is not limited to point feature data, statistical feature data, and primary stroke feature data.

A modeling processor 1130 is a server having circuitry configured to execute the processes of the modeling stage 130. The modeling processor 1130 is integrated with a modeling database 1135. The modeling database 1135 includes, but is not limited to trainer data, classifier data, and primary stroke model data.

A classification processor 1140 is a server having circuitry configured to execute the processes of the classification phase 140. The classification processor 1140 is integrated with a classification database 1145. The classification database 1145 includes, but is not limited to primary stroke recognition data, primary stroke model reduction data, and highest likelihood combination data.

A secondary feature extractor 1150 is a server having circuitry configured to execute the processes of the secondary feature extraction phase 150. The secondary feature extractor 1150 is integrated with a secondary feature extraction database 1155. The secondary feature extraction database 1155 includes, but is not limited to secondary stroke feature extraction data, secondary stroke feature data, secondary stroke identification data, trainer data, classifier data, secondary stroke candidate data, and data within a boundary of the structure.

FIG. 11 illustrates individual servers and associated databases for the pre-processor 1110, the primary feature extractor 1120, the modeling processor 1130, the classification processor 1140, and the secondary feature extractor 1150. However, the five servers and associated databases can be combined into a single server and database. In addition, there could be more than one server and associated database for any one of the pre-processor 1110, the primary feature extractor 1120, the modeling processor 1130, the classification processor 1140, and the secondary feature extractor 1150. Any particular combination of servers and databases and associated circuitry are contemplated by embodiments described herein and will depend upon the particular application of a character recognition system.

Each of the functions of the described embodiments can be implemented by one or more processing circuits. A processing circuit includes a programmed processor, which includes circuitry. A processing circuit/circuitry can also include devices such as an application specific integrated circuit (ASIC) and circuit components arranged to perform the recited functions. The processing circuitry can be referred to interchangeably as circuitry throughout the disclosure.

In addition, when processors are programmed to perform the processes described herein, they become special-purpose devices. The processes performed by the pre-processor 1110, the primary feature extractor 1120, the modeling processor 1130, the classification processor 1140, and the secondary feature extractor 1150 have specialized processing circuitry. The pre-processor 1110, the primary feature extractor 1120, the modeling processor 1130, the classification processor 1140, and the secondary feature extractor 1150 can be individual servers as illustrated in FIG. 11 or they can be combined into a single server.

Figure 12:
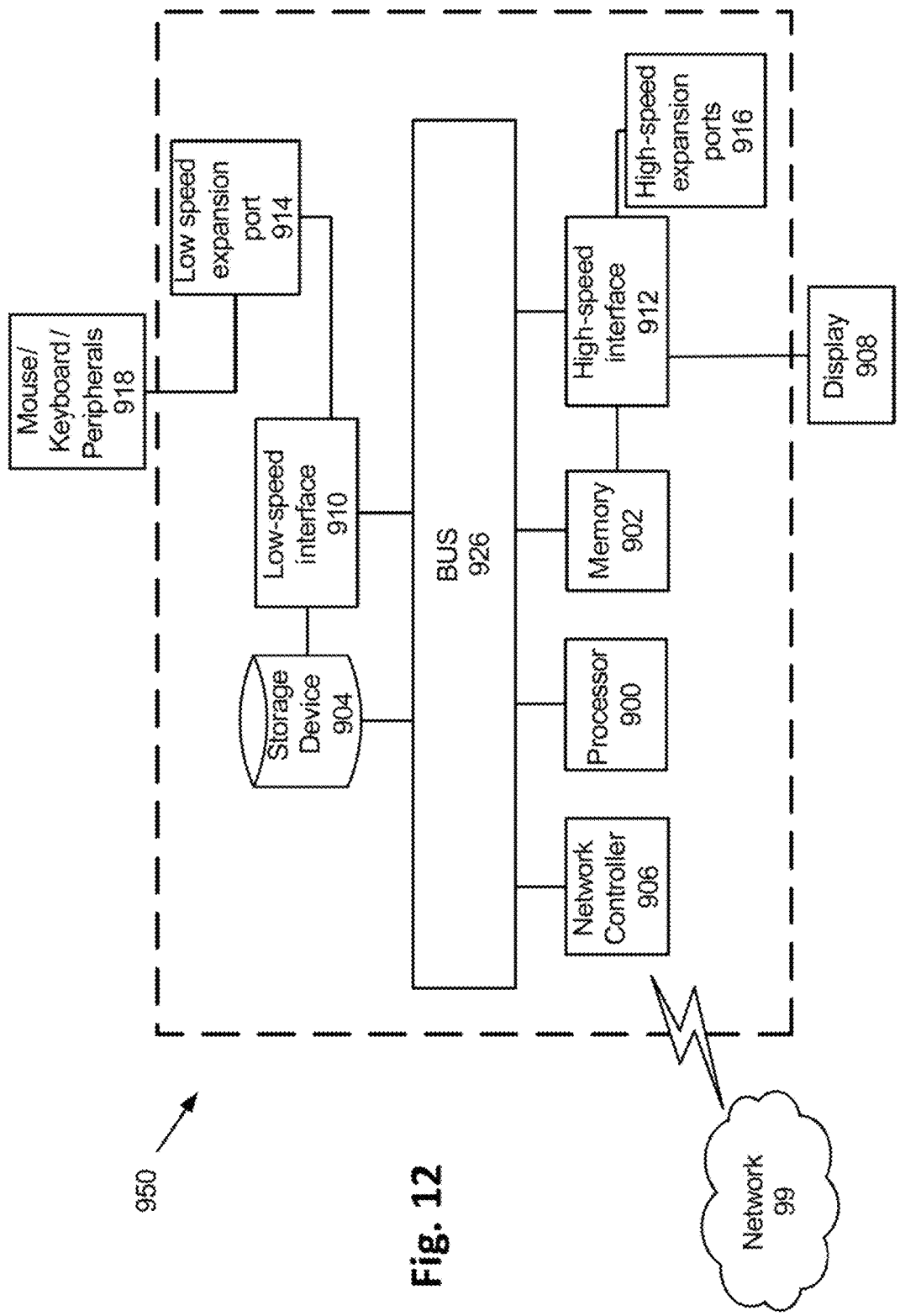
FIG. 12 is a schematic of an exemplary computing device according to one embodiment.

FIG. 12 is a schematic of an exemplary computing device 950, such as the pre-processor 1110, the primary feature extractor 1120, the modeling processor 1130, the classification processor 1140, and the secondary feature extractor 1150, all of which can be used to implement the techniques described in this disclosure. The computing device 950 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

In FIG. 12, the computing device 950 includes a processor 900, a memory 902, a storage device 904, a high-speed interface 912 connecting to the memory 902 and multiple high-speed expansion ports 916, and a low-speed interface 910 connecting to a low-speed expansion port 914 and the storage device 904. Each of the processor 900, the memory 902, the storage device 904, the high-speed interface 912, the high-speed expansion ports 916, and the low-speed interface 910 are interconnected using various busses, such as communication bus 926, and may be mounted on a common motherboard or in other manners as appropriate.

The processor 900 can process instructions for execution within the computing device 950, including instructions stored in the memory 902 or on the storage device 904 to display graphical information for a GUI on an external input/output device, such as a display 908 coupled to the high-speed interface 912. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 902 stores information within the computing device 950. In some implementations, the memory 902 is a volatile memory unit or units. In some implementations, the memory 902 is a non-volatile memory unit or units. The memory 902 can also be another form of computer-readable medium, such as a magnetic or optical disk.

The storage device 904 is capable of providing mass storage for the computing device 950. In some implementations, the storage device 904 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 900), perform one or more methods, such as those described above. The instructions can also be stored by one or more storage devices, such as computer- or machine-readable mediums (for example, the memory 902, the storage device 904, or memory on the processor 900).

The high-speed interface 912 manages bandwidth-intensive operations for the computing device 950, while the low-speed interface 910 manages lower bandwidth-intensive operations. Such allocation of functions is an example only. In some implementations, the high-speed interface 912 is coupled to the memory 902, the display 908 (e.g., through a graphics processor or accelerator), and to the high-speed expansion ports 916, which may accept various expansion cards (not shown). In the implementation, the low-speed interface 910 is coupled to the storage device 904 and the low-speed expansion port 914. The low-speed expansion port 914, which can include various communication ports (e.g., USB, Bluetooth, Ethernet, wireless Ethernet) can be coupled to one or more input/output devices 918, such as a keyboard, a pointing device, a scanner, or a networking device such as a switch or router, e.g., through a network adapter.

The computing device 950 also includes a network controller 906, such as an Intel Ethernet PRO network interface card from Intel Corporation of America, for interfacing with a network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Although the computing device of FIG. 9 is described as having a storage medium device 904, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 908 (e.g., a CRT (cathode ray tube) or LCD (liquid crystal display) monitor) for displaying information to the user and a keyboard and a pointing device 918 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Embodiments described herein can be implemented in conjunction with one or more of the devices described above with reference to FIG. 12. Embodiments are a combination of hardware and software, and processing circuitry by which the software is implemented.

Figure 13:
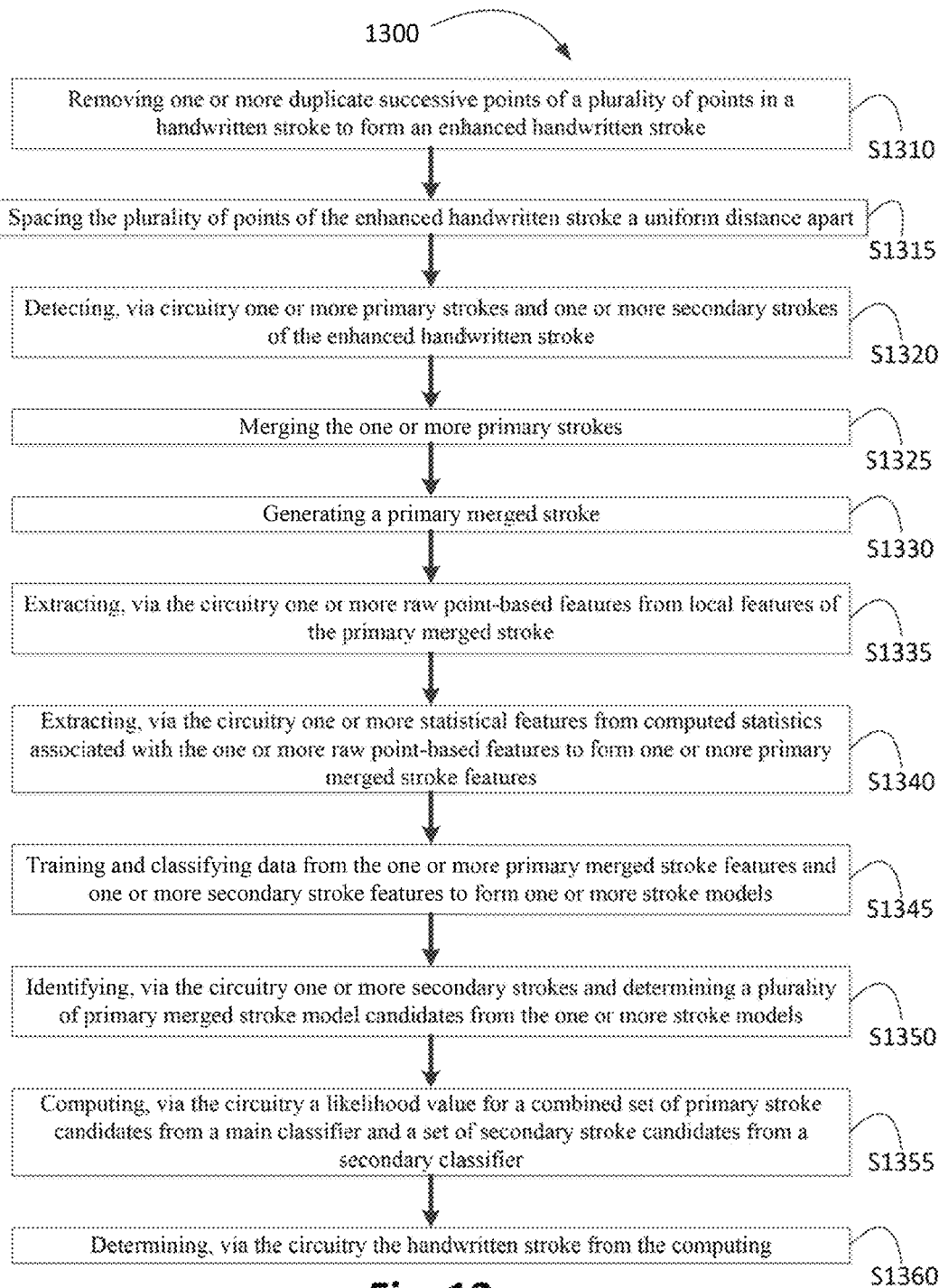
FIG. 13 is an exemplary flowchart for a method of character recognition according to one embodiment.

FIG. 13 is an exemplary flowchart for a method 1300 of character recognition according to an aspect of the present disclosure. Method 1300 includes programmable computer-executable instructions, that when used in combination with the above-described hardware devices, carry out the steps of method 1300. The hardware description above, exemplified by the structural example illustrated in FIG. 12 constitutes or includes specialized corresponding structure that is programmed or configured to perform the algorithm illustrated in FIG. 13.

Method 1300 includes step S1310 in which one or more duplicate successive points of a plurality of points in a handwritten stroke are removed to form an enhanced handwritten stroke. In step S1315, the plurality of points of the enhanced handwritten stroke is spaced a uniform distance apart.

In step S1320, one or more primary strokes and one or more secondary strokes of the enhanced handwritten stroke are detected, via circuitry. In one embodiment, the one or more secondary strokes include one or more delayed strokes.

In step S1325, the one or more primary strokes are merged. In step S1330, a primary merged stroke is generated.

In step S1335, one or more raw point-based features are extracted from local features of the primary merged stroke. In one embodiment, the one or more raw point-based features describe one or more geometric characteristics including an axis coordinate, a distance, a relative position, an aspect ratio, a curvature, a slope, a tangent, a cosine, a sine, an angle, and a writing direction.

In step S1340, one or more statistical features are extracted from computed statistics associated with the one or more raw point-based features to form one or more primary merged stroke features. In one embodiment, the one or more statistical features include one or more of a size of the primary merged stroke, a size of the secondary stroke, a distance between primary merged strokes or secondary strokes, a ratio of points lying above, below, left-side, or right-side of the primary merged strokes or secondary strokes, and an order of input of the primary merged strokes or secondary strokes.

In step S1345, data from one or more primary merged stroke features and one or more secondary stroke features are trained and classified to form one or more stroke models. In one embodiment, one or more of a K-Nearest Neighbor classifier, a Bayes Network classifier, or a Dynamic Bayes Network classifier is utilized for secondary stroke identification.

In step S1350, one or more secondary strokes are identified, and a plurality of primary merged stroke model candidates are determined from the one or more stroke models.

In step S1355, a likelihood value is computed, via the circuitry for a combined set of primary stroke candidates from a main classifier and a set of secondary stroke candidates from a secondary classifier. In step S1360, the handwritten stroke is determined, via the circuitry from the computing.

Embodiments described herein include the following aspects.

(1) A method of character recognition, includes removing one or more duplicate successive points of a plurality of points in a handwritten stroke to form an enhanced handwritten stroke; spacing the plurality of points of the enhanced handwritten stroke a uniform distance apart; detecting, via circuitry, one or more primary strokes and one or more secondary strokes of the enhanced handwritten stroke; merging the one or more primary strokes; generating a primary merged stroke; extracting, via the circuitry one or more raw point-based features from local features of the primary merged stroke; extracting, via the circuitry one or more statistical features from computed statistics associated with the one or more raw point-based features to form one or more primary merged stroke features; training and classifying data from the one or more primary merged stroke features and one or more secondary stroke features to form one or more stroke models; identifying, via the circuitry one or more secondary strokes and determining a plurality of primary merged stroke model candidates from the one or more stroke models; computing, via the circuitry a likelihood value for a combined set of primary stroke candidates from a main classifier and a set of secondary stroke candidates from a secondary classifier; and determining, via the circuitry the handwritten stroke from the computing.

(2) The method of character recognition of (1), further includes identifying at least one secondary stroke to reduce one or more of the stroke models of the primary merged stroke.

(3) The method of character recognition of either (1) or (2), wherein the one or more secondary strokes include one or more delayed strokes.

(4) The method of character recognition of any one of (1) through (3), further includes utilizing one or more classification models when there is a predetermined amount of variability in writing styles for a plurality of handwritten stroke samples.

(5) The method of character recognition of any one of (1) through (4), further includes utilizing one or more classification models when the handwritten stroke can be represented by a different number of strokes.

(6) The method of character recognition of any one of (1) through (5), wherein the one or more raw point-based features describe one or more geometric characteristics including an axis coordinate, a distance, a relative position, an aspect ratio, a curvature, a slope, a tangent, a cosine, a sine, an angle, and a writing direction.

(7) The method of character recognition of any one of (1) through (6), wherein the statistical features include one or more of a size of the primary merged stroke, a size of the secondary stroke, a distance between primary merged strokes or secondary strokes, a ratio of points lying above, below, left-side, or right-side of the primary merged strokes or secondary strokes, and an order of input of the primary merged strokes or secondary strokes.

(8) The method of character recognition of any one of (1) through (7), wherein the statistical features include one or more of a histogram of a Freeman Code, a mean of a tangent, a mode of one or more angles, a variance of distances, a mean of the Freeman Code, a histogram of a cosine, a variance of angles, a mean of distances, a mode of the Freeman Code, a mean of a sine, a variance of an x-axis, a mean of curliness, a maximum of the Freeman Code, a variance of the cosine, a variance of curvature, and a variance of the Freeman Code.

(9) The method of character recognition of any one of (1) through (8), further includes utilizing one or more of a K-Nearest Neighbor classifier, a Bayes Network classifier, or a Dynamic Bayes Network classifier for secondary stroke identification.

(10) The method of character recognition of any one of (1) through (9), further includes utilizing a Dynamic Bayes Network-based Hidden Markov Model classifier for primary merged stroke classification.

(11) The method of character recognition of any one of (1) through (10), further includes utilizing a principle component analysis to obtain selection of one or more stroke features and reduction of one or more stroke models.

(12) A character recognition device includes circuitry. The circuitry is configured to remove one or more duplicate successive points of a plurality of points in a handwritten stroke to form an enhanced handwritten stroke; space the plurality of points of the enhanced handwritten stroke a uniform distance apart; detect one or more primary strokes and one or more secondary strokes of the enhanced handwritten stroke; merge the one or more primary strokes; generate a primary merged stroke; extract one or more raw point-based features from local features of the primary merged stroke; extract one or more statistical features from computed statistics associated with the one or more raw point-based features to form one or more primary merged stroke features; train and classify data from the one or more primary merged stroke features and one or more secondary stroke features to form one or more stroke models; identify one or more secondary strokes and determine a plurality of primary merged stroke model candidates from the one or more stroke models; compute a likelihood value for a combined set of primary stroke candidates from a main classifier and a set of secondary stroke candidates from a secondary classifier; and determine the handwritten stroke from the computing.

(13) The character recognition device of (12), wherein the circuitry is further configured to identify at least one secondary stroke to reduce one or more of the stroke models of the primary merged stroke.

(14) The character recognition device of either (12) or (13), wherein the circuitry is further configured to utilize one or more classification models when there is a predetermined amount of variability in writing styles for a plurality of handwritten stroke samples.

(15) The character recognition device of any one of (12) through (14), wherein the circuitry is further configured to utilize one or more classification models when the handwritten stroke can be represented by a different number of strokes.

(16) The character recognition device of any one of (12) through (15), wherein the statistical features include one or more of a histogram of a Freeman Code, a mean of a tangent, a mode of one or more angles, a variance of distances, a mean of the Freeman Code, a histogram of a cosine, a variance of angles, a mean of distances, a mode of the Freeman Code, a mean of a sine, a variance of an x-axis, a mean of curliness, a maximum of the Freeman Code, a variance of the cosine, a variance of curvature, and a variance of the Freeman Code.

(17) The character recognition device of any one of (12) through (16), wherein the circuitry is further configured to utilize one or more of a K-Nearest Neighbor classifier, a Bayes Network classifier, or a Dynamic Bayes Network classifier for secondary stroke identification.

(18) The character recognition device of any one of (12) through (17), wherein the circuitry is further configured to utilize a Dynamic Bayes Network-based Hidden Markov Model classifier for primary merged stroke classification.

(19) The character recognition device of any one of (12) through (18), wherein the circuitry is further configured to utilize a principle component analysis to obtain selection of one or more stroke features and reduction of one or more stroke models.

(20) A non-transitory computer-readable medium having computer-executable instructions embodied thereon, that when executed by a computing device causes the computing device to perform a method. The method includes removing one or more duplicate successive points of a plurality of points in a handwritten stroke to form an enhanced handwritten stroke; spacing the plurality of points of the enhanced handwritten stroke a uniform distance apart; detecting one or more primary strokes and one or more secondary strokes of the enhanced handwritten stroke; merging the one or more primary strokes; generating a primary merged stroke; extracting one or more raw point-based features from local features of the primary merged stroke; extracting one or more statistical features from computed statistics associated with the one or more raw point-based features to form one or more primary merged stroke features; training and classifying data from the one or more primary merged stroke features and one or more secondary stroke features to form one or more stroke models; identifying one or more secondary strokes and determining a plurality of primary merged stroke model candidates from the one or more stroke models; computing a likelihood value for a combined set of primary stroke candidates from a main classifier and a set of secondary stroke candidates from a secondary classifier; and determining the handwritten stroke from the computing.

In summary, a framework for online Arabic character recognition is described. The framework includes delayed strokes processing and feature extraction of many statistical features. The delayed processing of strokes was integrated into the different phases. One aspect of embodiments described herein is the methodology of handling the delayed strokes. The delayed strokes are handled at different phases of the recognition process differently to improve the overall performance.

Several statistical features were utilized using the character recognition architectural framework and algorithm. Embodiments were tested with unconstrained online Arabic characters segmented from online text. Since the data was unconstrained, it had large variability and different styles of online writing. A database of over 22,000 characters written by seventy three writers was used.

Embodiments described herein provide an improved system and method for recognizing online handwritten text in which delayed strokes are included, such as the Arabic language. The secondary strokes features phase integrated with the other phases provided a more precise character recognition system and method.

Several advantages are recognized using embodiments described herein. For example, a merging process is developed within the pre-processing phase to form one connected stroke, which addresses internal discontinuity problems. Multi-stroke recognition is used in different phases to address characters with dots and diacritics. Several statistical features are considered for improved results, such as a histogram of a Freeman Code, a mean of a tangent, a mode of one or more angles, a variance of distances, a mean of the Freeman Code, a histogram of a cosine, a variance of angles, a mean of distances, a mode of the Freeman Code, a mean of a sine, a variance of an x-axis, a mean of curliness, a maximum of the Freeman Code, a variance of the cosine, a variance of curvature, and a variance of the Freeman Code. More new features can be extracted using a local point-based feature over a sliding window to calculate the statistics of the obtained vector to achieve more statistical features. The classification phase of embodiments described herein consider primary and secondary strokes, which are combined to obtain an overall result of better character classification.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A method of character recognition, the character having a main stroke defining a main form of the character and optional secondary strokes external to the main form of the character, the method comprising:
removing one or more duplicate successive points of a plurality of points in a handwritten character to form an enhanced handwritten character;
spacing the plurality of points of the enhanced handwritten character a uniform distance apart;
detecting, via circuitry, one or more primary strokes corresponding to the main form of the character and one or more ancillary strokes of the enhanced handwritten character;
generating a primary merged stroke from the one or more primary strokes;
extracting, via the circuitry, one or more raw point-based features from local features of the primary merged stroke;
extracting, via the circuitry, one or more statistical features from statistics computed over the one or more raw point-based features to form one or more primary merged stroke features;
extracting, via the circuitry, one or more features from the ancillary strokes to form one or more ancillary stroke features;
training one or more stroke models on features of the main stroke and features of the secondary strokes and classifying data from the one or more primary merged stroke features and the one or more ancillary stroke features using the trained one or more stroke models;
determining, via the circuitry, a set of main stroke candidates and a set of secondary stroke candidates from the data classified by the one or more stroke models;
computing, via the circuitry, likelihood values indicative of whether respective main strokes of the set of main stroke candidates combined with respective secondary strokes from the set of secondary stroke candidates form the character; and
determining, via the circuitry, the character from the likelihood values.

2. The method of claim 1, further comprising:
omitting one or more of the stroke models from classification of the primary merged stroke based on presence of the secondary stroke candidates.

3. The method of claim 1, wherein the one or more ancillary strokes include one or more delayed strokes.

4. The method of claim 1, further comprising:
selecting one or more classification models based on whether there is a predetermined amount of variability in writing styles for a plurality of handwritten stroke samples.

5. The method of claim 1, further comprising:
utilizing one or more classification models based on whether the handwritten character can be represented by a different number of strokes.

6. The method of claim 1, wherein the one or more raw point-based features describe one or more geometric characteristics including an axis coordinate, a distance, a relative position, an aspect ratio, a curvature, a slope, a tangent, a cosine, a sine, an angle, and a writing direction.

7. The method of claim 1, wherein the statistical features include one or more of a size of the primary merged stroke, a size of the ancillary stroke, a distance between primary merged strokes or ancillary strokes, a ratio of points lying above, below, left-side, or right-side of the primary merged strokes or ancillary strokes, and an order of input of the primary merged strokes or ancillary strokes.

8. The method of claim 1, wherein the statistical features include one or more of a histogram of a Freeman Code, a mean of a tangent, a mode of one or more angles, a variance of distances, a mean of the Freeman Code, a histogram of a cosine, a variance of angles, a mean of distances, a mode of the Freeman Code, a mean of a sine, a variance of an x-axis, a mean of curliness, a maximum of the Freeman Code, a variance of the cosine, a variance of curvature, and a variance of the Freeman Code.

9. The method of claim 1, further comprising:
utilizing one or more of a K-Nearest Neighbor classifier, a Bayes Network classifier, or a Dynamic Bayes Network classifier for secondary stroke classification.

10. The method of claim 1, further comprising:
utilizing a Dynamic Bayes Network-based Hidden Markov Model classifier for primary merged stroke classification.

11. The method of claim 1, further comprising:
utilizing a principle component analysis to obtain selection of one or more stroke features and reduction of one or more stroke models.

12. A character recognition device, the character having a main stroke defining a main form of the character and optional secondary strokes external to the main form of the character, the device comprising:
circuitry configured to:
remove one or more duplicate successive points of a plurality of points in a handwritten character to form an enhanced handwritten character;
space the plurality of points of the enhanced handwritten character a uniform distance apart;
detect one or more primary strokes corresponding to the main form of the character and one or more ancillary strokes of the enhanced handwritten character;
generate a primary merged stroke from the one or more primary strokes;
extract one or more raw point-based features from local features of the primary merged stroke;
extract one or more statistical features from statistics computed over the one or more raw point-based features to form one or more primary merged stroke features;
extract one or more features from the ancillary strokes to form one or more additional stroke features;
train one or more stroke models on features of the main stroke and features of the secondary strokes and classify data from the one or more primary merged stroke features and the one or more ancillary stroke features using the trained one or more stroke models;
a set of main stroke candidates and a set of secondary stroke candidates from the data classified by the one or more stroke models;
compute likelihood values indicative of whether respective main strokes of the set of main stroke candidates combined with respective secondary strokes from the set of secondary stroke candidates form the character; and
determine the character from the combined likelihood values.

13. The character recognition device of claim 12, wherein the circuitry is further configured to omitting one or more of the stroke models from classification of the primary merged stroke based on presence of the secondary stroke candidates.

14. The character recognition device of claim 12, wherein the circuitry is further configured to select one or more classification models based on whether there is a predetermined amount of variability in writing styles for a plurality of handwritten stroke samples.

15. The character recognition device of claim 12, wherein the circuitry is further configured to utilize one or more classification models based on whether the handwritten character can be represented by a different number of strokes.

16. The character recognition device of claim 12, wherein the statistical features include one or more of a histogram of a Freeman Code, a mean of a tangent, a mode of one or more angles, a variance of distances, a mean of the Freeman Code, a histogram of a cosine, a variance of angles, a mean of distances, a mode of the Freeman Code, a mean of a sine, a variance of an x-axis, a mean of curliness, a maximum of the Freeman Code, a variance of the cosine, a variance of curvature, and a variance of the Freeman Code.

17. The character recognition device of claim 12, wherein the circuitry is further configured to utilize one or more of a K-Nearest Neighbor classifier, a Bayes Network classifier, or a Dynamic Bayes Network classifier for secondary stroke classification.

18. The character recognition device of claim 12, wherein the circuitry is further configured to utilize a Dynamic Bayes Network-based Hidden Markov Model classifier for primary merged stroke classification.

19. The character recognition device of claim 12, wherein the circuitry is further configured to utilize a principle component analysis to obtain selection of one or more stroke features and reduction of one or more stroke models.

20. A non-transitory computer-readable medium having computer-executable instructions embodied thereon, that when executed by a computing device causes the computing device to perform a method comprising:
removing one or more duplicate successive points of a plurality of points in a handwritten character to form an enhanced handwritten character;
spacing the plurality of points of the enhanced handwritten character a uniform distance apart;
detecting one or more primary strokes corresponding to the main form of the character and one or more ancillary strokes of the enhanced handwritten character;
generating a primary merged stroke from the one or more primary strokes;
extracting one or more raw point-based features from local features of the primary merged stroke;
extracting one or more statistical features from statistics computed over the one or more raw point-based features to form one or more primary merged stroke features;

extracting one or more features from the ancillary strokes to form one or more ancillary stroke features;

training one or more stroke models on features of the main stroke and features of the secondary strokes and classifying data from the one or more primary merged stroke features and the one or more ancillary stroke features using the trained one or more stroke models;

determining a set of main stroke candidates and a set of secondary stroke candidates from the data classified by the one or more stroke models;

computing likelihood values indicative of whether respective main strokes of the set of main stroke candidates combined with respective secondary strokes from the set of secondary stroke candidates form the character; and determining the character from the combined likelihood values.

\* \* \* \* \*